US012349778B2

(12) United States Patent
Charraud et al.

(10) Patent No.: US 12,349,778 B2
(45) Date of Patent: Jul. 8, 2025

(54) DEVICE AUTOCLEANING SYSTEM BASED ON MULTI CANAL AND SMART FORMULA CARTRIDGE

(71) Applicant: L'Oreal, Paris (FR)

(72) Inventors: Gregoire Charraud, Jersey City, NJ (US); Ji Lee, New York, NY (US)

(73) Assignee: L'Oreal, Paris (FR)

( * ) Notice: Subject to any disclaimer, the term of this patent is extended or adjusted under 35 U.S.C. 154(b) by 458 days.

(21) Appl. No.: 17/816,101

(22) Filed: Jul. 29, 2022

(65) Prior Publication Data

US 2024/0032671 A1 Feb. 1, 2024

(51) Int. Cl.
*A45D 34/04* (2006.01)
*A45D 19/00* (2006.01)
(Continued)

(52) U.S. Cl.
CPC ....... *A45D 34/042* (2013.01); *A45D 19/0041* (2021.01); *A46B 11/0065* (2013.01); (Continued)

(58) Field of Classification Search
None
See application file for complete search history.

(56) References Cited

U.S. PATENT DOCUMENTS 1,190,017 A * 7/1916 Scheel .................. A45D 24/24
132/116
1,818,281 A * 8/1931 Soss .................... A46B 11/066
15/22.1

(Continued)

FOREIGN PATENT DOCUMENTS

FR 2277546 A1 2/1976
KR 100421691 B1 1/2004
(Continued)

OTHER PUBLICATIONS

International Search Report and Written Opinion received in corresponding International Application No. PCT/US2023/070895, filed Jul. 25, 2023, mailed Oct. 6, 2023, 12 pages.
(Continued)

*Primary Examiner* — Paul R Durand
*Assistant Examiner* — Michael J. Melaragno
(74) *Attorney, Agent, or Firm* — CHRISTENSEN O'CONNOR JOHNSON KINDNESS PLLC

(57) ABSTRACT

Formulation delivery systems, formulation delivery devices, and formulation cartridges for the same are provided. Formulation delivery systems include a reusable handle, a formulation dispensing assembly, and a controller. The formulation dispensing assembly includes a reciprocating nozzle assembly and a pump. The reciprocating nozzle assembly is fluidically-couplable to the formulation cartridge or the cleaning cartridge received within the reusable handle. Formulation delivery devices include a reusable handle configured to receive a formulation cartridge therein, and a formulation dispensing assembly disposed in the reusable handle. The formulation dispensing assembly includes fluid conduits, a pump fluidically connected to the fluid conduits, a reciprocating nozzle assembly, and a controller. Formulation cartridges include a reusable cartridge body and a formulation cartridge refill unit.

19 Claims, 20 Drawing Sheets

(51) Int. Cl.

| | |
|---|---|
| ***A46B 11/00*** | (2006.01) |
| ***A46B 15/00*** | (2006.01) |
| ***A46B 17/06*** | (2006.01) |
| ***B08B 9/032*** | (2006.01) |

(52) U.S. Cl.

CPC ...... *A46B 11/0072* (2013.01); *A46B 15/0004* (2013.01); *A46B 17/06* (2013.01); *B08B 9/0325* (2013.01); *A46B 2200/104* (2013.01); *B08B 2209/032* (2013.01)

(56) References Cited

U.S. PATENT DOCUMENTS

| | | | | | |
|---|---|---|---|---|---|
| 2,074,481 | A * | 3/1937 | Macmullen | A45D 24/30 | 55/439 |
| 2,272,641 | A * | 2/1942 | Mureau | A45D 40/262 | 401/174 |
| 2,799,881 | A * | 7/1957 | Howe | G01F 11/021 | 401/175 |
| 5,297,697 | A * | 3/1994 | Boring | B05C 17/00596 | 222/541.2 |
| 6,877,924 | B1 * | 4/2005 | Mears | B65D 81/3283 | 401/47 |
| 7,648,364 | B2 * | 1/2010 | Dauga | A45D 44/005 | 601/17 |
| 8,343,116 | B2 * | 1/2013 | Ignon | A61P 17/02 | 604/289 |
| 10,598,230 | B2 | 3/2020 | Grez et al. | | |
| 10,694,832 | B2 | 6/2020 | Grez | | |
| 11,399,617 | B2 * | 8/2022 | Dinh | B05B 11/1004 | |
| 2016/0143408 | A1 | 5/2016 | Grez | | |
| 2016/0331308 | A1 * | 11/2016 | Zhou | A61M 35/003 | |
| 2017/0251783 | A1 | 9/2017 | Grez | | |
| 2018/0116363 | A1 | 5/2018 | Grez | | |
| 2019/0098974 | A1 | 4/2019 | Grez et al. | | |
| 2019/0098975 | A1 | 4/2019 | Grez et al. | | |
| 2019/0098976 | A1 | 4/2019 | Grez et al. | | |
| 2020/0354134 | A1 | 11/2020 | Sherrell et al. | | |
| 2022/0273400 | A1 * | 9/2022 | Lee | A46B 13/02 | |
| 2023/0189956 | A1 * | 6/2023 | Lee | A45D 34/04 | 132/200 |
| 2023/0189958 | A1 * | 6/2023 | Lee | A45D 19/02 | 132/112 |
| 2023/0218057 | A1 * | 7/2023 | Lee | A45D 19/02 | 222/325 |
| 2023/0232965 | A1 * | 7/2023 | Xing | A45D 44/005 | 132/212 |
| 2024/0032671 | A1 * | 2/2024 | Charraud | A46B 11/0072 | |
| 2024/0172858 | A1 * | 5/2024 | Jablonski | A45D 19/00 | |

FOREIGN PATENT DOCUMENTS

| | | | | |
|---|---|---|---|---|
| WO | WO-2019067336 | A3 * | 7/2019 | A45D 19/0066 |
| WO | WO-2022182669 | A1 * | 9/2022 | A45D 24/22 |
| WO | WO-2022182670 | A1 * | 9/2022 | A45D 19/026 |
| WO | WO-2022182671 | A1 * | 9/2022 | B01F 23/45 |
| WO | WO-2024026282 | A1 * | 2/2024 | A45D 19/026 |

OTHER PUBLICATIONS

Search Report and Written Opinion mailed Feb. 28, 2023, issued in corresponding French Application No. FR2209070, filed Sep. 9, 2022, 6 pages.

International Preliminary Report on Patentability and Written Opinion mailed Feb. 13, 2025, issued in corresponding International Application No. PCT/US2023/070895, filed Jul. 25, 2023, 7 pages.

* cited by examiner

DEVICE AUTOCLEANING SYSTEM BASED ON MULTI CANAL AND SMART FORMULA CARTRIDGE

SUMMARY

In an aspect, the present disclosure is directed to, among other things, systems, devices, and cartridges for delivering a formulation, and methods for using the same. In an embodiment, described are one or more methodologies or technologies that are configured to deliver a cosmetic formulation having a dye component and a developer component to a user's skin, hair, and the like. Advantageously, the disclosed embodiments provide better user experience, better performance and reliability, and more sustainable construction.

In one aspect, a formulation cartridge, including a handle portion, and a refill unit configured to sit within the handle portion, the refill unit including a formulation vessel storing a formulation and comprising a first valve in fluid communication with the formulation, a cleaning vessel storing a cleaning fluid and comprising a second valve in fluid communication with the cleaning fluid, and a valve selector configured to selectively permit the formulation to pass from the first valve or the cleaning fluid to pass from the second valve is disclosed.

In another aspect, a system for dispensing a formulation, the system including a formulation cartridge, including a handle portion, and a refill unit configured to sit within the handle portion, the refill unit including a formulation vessel storing a formulation and comprising a first valve in fluid communication with the formulation, a cleaning vessel storing a cleaning fluid and comprising a second valve in fluid communication with the cleaning fluid, and a valve selector configured to selectively permit the formulation to pass from the first valve or the cleaning fluid to pass from the second valve, and a delivery device configured to communicatively coupled to the formulation cartridge, wherein the delivery device comprises a processor configured to place the delivery device into a dispensing mode, adjust the valve selector into a dispensing position, dispense a formulation from the formulation cartridge, place the delivery device into a cleaning mode, adjust the valve selector into a cleaning position, and run a cleaning cycle is disclosed.

In yet another aspect, a method of cleaning the system of Claim 8, including placing the delivery device into the dispensing mode, adjusting the valve selector into the dispensing position, dispensing the formulation from the formulation cartridge, placing the delivery device into the cleaning mode, adjusting the valve selector into the cleaning position, and running the cleaning cycle.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
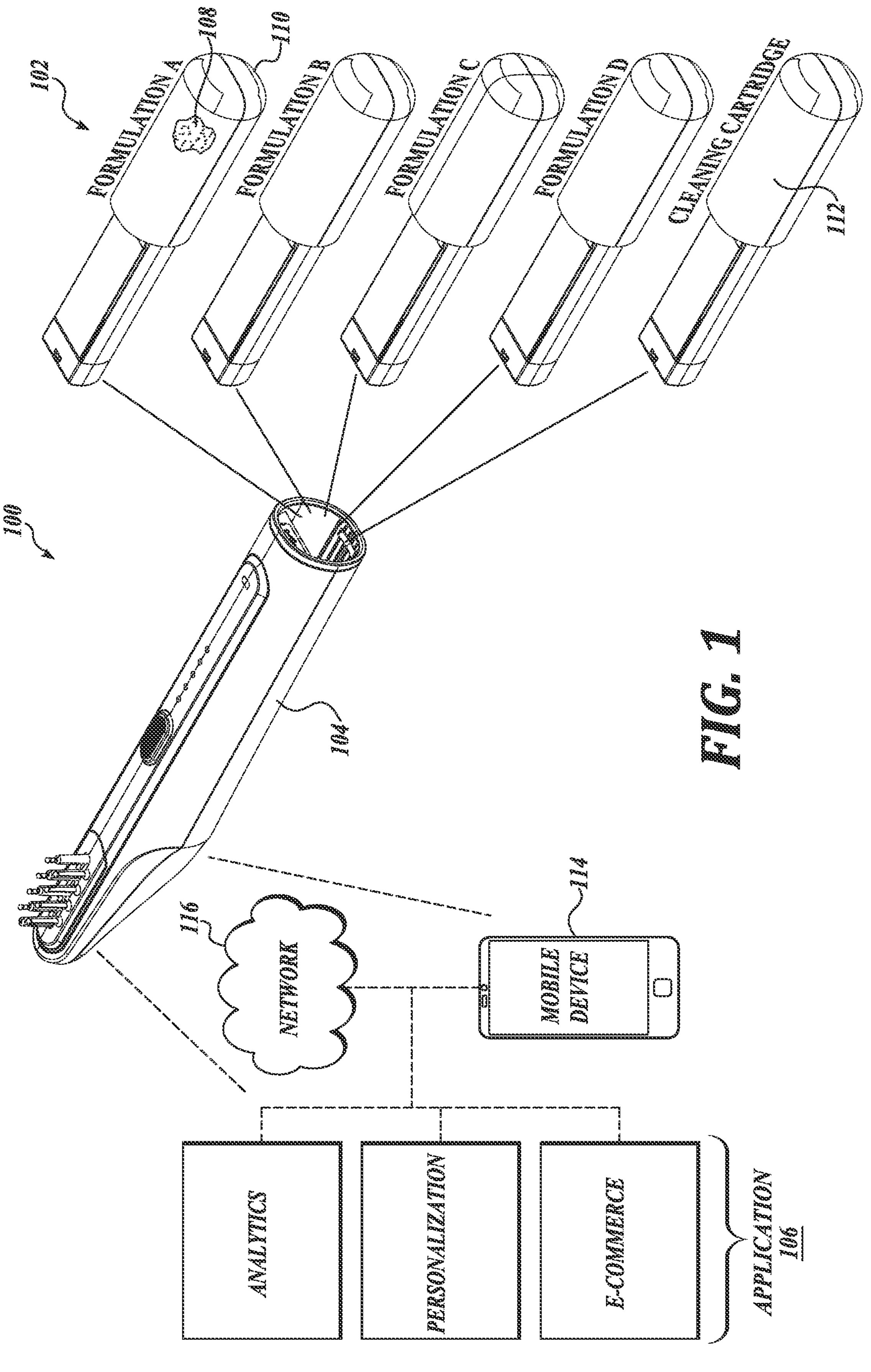
FIG. 1 shows a schematic view of a formulation delivery system, in accordance with a representative embodiment of the present disclosure.

While illustrative embodiments have been illustrated and described, it will be appreciated that various changes can be made therein without departing from the spirit and scope of the invention.

Described are one or more methodologies or technologies for allowing users to apply treatment formulations to human hair and scalp tissue. The following description provides representative examples that relate generally to hair and scalp treatment delivery systems, devices, and formulation cartridges for the same. In an embodiment, it is beneficial for the treatment formulation to be applied to a targeted portion of the hair or scalp tissue. In an embodiment, applying a treatment formulation to a portion of the hair near the scalp is desired, for instance, when applying a coloring dye to roots of hair during a color maintenance procedure. In another example, an approach requires applying a scalp treatment formulation directly to the scalp tissue, while minimizing contact with the hair.

Existing systems for the application of hair and scalp treatment formulations have been widely used. In one example, hair-coloring kits are generally used to change the appearance of the hair color or to blend gray hairs, among other uses. Existing hair coloring systems have several disadvantages, including difficulty of use, time consumption, uneven coverage, unpredictable results, excessive mess, etc. In one aspect, existing hair coloring systems can be ineffective in blending and coloring the roots of the hair after new segments of hair have grown from the scalp, where the natural hair color differs from the remainder of the dyed hair. The present disclosure is directed toward solving these and other needs.

In some embodiments, hair coloring formulation includes at least one dye and a separate developer, which are mixed in controlled proportions. However, "formulation" is not limited to dye and developer in this disclosure. In an embodiment, "formulation" refers generally to any of the dye, developer, formulation, fluid, or any mixture thereof. In an embodiments, "formulation" includes: permanent hair dye; semi-permanent hair dye; developer; conditioner; hair growth treatment, such as minoxidil manufactured under the trade name ROGAINE®; hair protein treatment; disulfide bond repairing hair treatment; fluid hair treatment; fluid scalp treatment, and the like. In an embodiment, "formulation" includes anti-dandruff formulation, dry scalp treatment formulation, itchy scalp treatment formulation, and the like. In an embodiment, "formulation" includes scalp care formulation, scalp cleanser formulation, scalp conditioner formulation, scalp detox (detoxification) formulation, and the like.

Embodiments of the present disclosure are configured to apply formulation to targeted areas of the hair and scalp tissue. Although any of the above-mentioned formulations are suitably applied using the embodiments described herein, the present disclosure generally refers to hair coloring formulation as one example of treatment formulation applied by the systems and devices described below. However, it shall be appreciated that any of the systems, devices, cartridges, and methods may be utilized with any of the noted formulations.

In one aspect, the present disclosure relates to a formulation cartridge, including a handle portion, and a refill unit configured to sit within the handle portion, the refill unit including a formulation vessel storing a formulation and comprising a first valve in fluid communication with the formulation, a cleaning vessel storing a cleaning fluid and comprising a second valve in fluid communication with the cleaning fluid, and a valve selector configured to selectively permit the formulation to pass from the first valve or the cleaning fluid to pass from the second valve.

In some embodiments, the valve selector comprises a rotating barrel comprising an aperture through a distal surface thereof, wherein the valve selector is configured to selectively obstruct the first valve or the second valve. In some embodiments, the valve selector comprises a processor communicatively coupled to the first valve.

In some embodiments, the refill unit further comprises a cleaning fluid collection vessel comprising a third valve. In some embodiments, the refill unit comprises a shell enclosing the formulation vessel and the cleaning vessel. In some embodiments, the shell is secured to a valve frame which receives the first valve and the second valve.

In some embodiments, the formulation cartridge further includes an encryption chip disposed on the refill unit and storing at least a cleaning fluid identifier.

In another aspect, the present disclosure relates to a system for dispensing a formulation, the system including a formulation cartridge, including a handle portion, and a refill unit configured to sit within the handle portion, the refill unit including a formulation vessel storing a formulation and comprising a first valve in fluid communication with the formulation, a cleaning vessel storing a cleaning fluid and comprising a second valve in fluid communication with the cleaning fluid, and a valve selector configured to selectively permit the formulation to pass from the first valve or the cleaning fluid to pass from the second valve, and a delivery device configured to communicatively coupled to the formulation cartridge, where the delivery device comprises a processor configured to place the delivery device into a dispensing mode, adjust the valve selector into a dispensing position, dispense a formulation from the formulation cartridge, place the delivery device into a cleaning mode, adjust the valve selector into a cleaning position, and run a cleaning cycle.

In some embodiments, the delivery device further comprises an adaptor configured to close the first valve and the second valve. In some embodiments, the adaptor is further configured to direct the cleaning fluid back to the cartridge after the cleaning fluid has passed through the second valve. In some embodiments, the handle further comprises a return fluid conduit configured to return the cleaning fluid into a location in the formulation cartridge. In some embodiments, the location is the cleaning vessel. In some embodiments, the location is a waste reservoir.

In yet another aspect, the present disclosure is related to method of cleaning the disclosed system, including placing the delivery device into the dispensing mode, adjusting the valve selector into the dispensing position, dispensing the formulation from the formulation cartridge, placing the delivery device into the cleaning mode, adjusting the valve selector into the cleaning position, and running the cleaning cycle.

In some embodiments, the valve selector is adjusted by the processor on the delivery device. In some embodiments, the valve selector is adjusted manually by a user of the delivery device.

In some embodiments, running the cleaning cycle includes dispensing the cleaning fluid through the device. In some embodiments, the method further includes pumping the cleaning fluid out of the valve selector for a duration and withdrawing the cleaning fluid into a location in the delivery device. In some embodiments, the location is the cleaning vessel. In some embodiments, the method further includes pumping the cleaning fluid out of the valve selector for a duration and pulling water from a sink into the cleaning vessel.

FIG. 1 illustrates one representative formulation delivery system 100 in accordance with the present disclosure. The formulation delivery system 100 includes a number of different features, including a formulation product line 102, a formulation delivery device 104, and an optional application 106, which together enable a customized user experience.

Formulation product line 102 includes different formulations 108, each being stored in a same (common) formulation cartridge 110 type that is configured for use with the formulation delivery device 104. Cartridges of the common formulation cartridge type are generally configured for insertion into a cartridge cavity of a reusable handle of the formulation delivery device. For example, in some embodiments, formulation cartridges and cleaning cartridges have a common cross-sectional shape and dimensions. Additionally, some embodiments of the common formulation cartridge type have a common number and arrangement of output nozzles.

Figure 2:
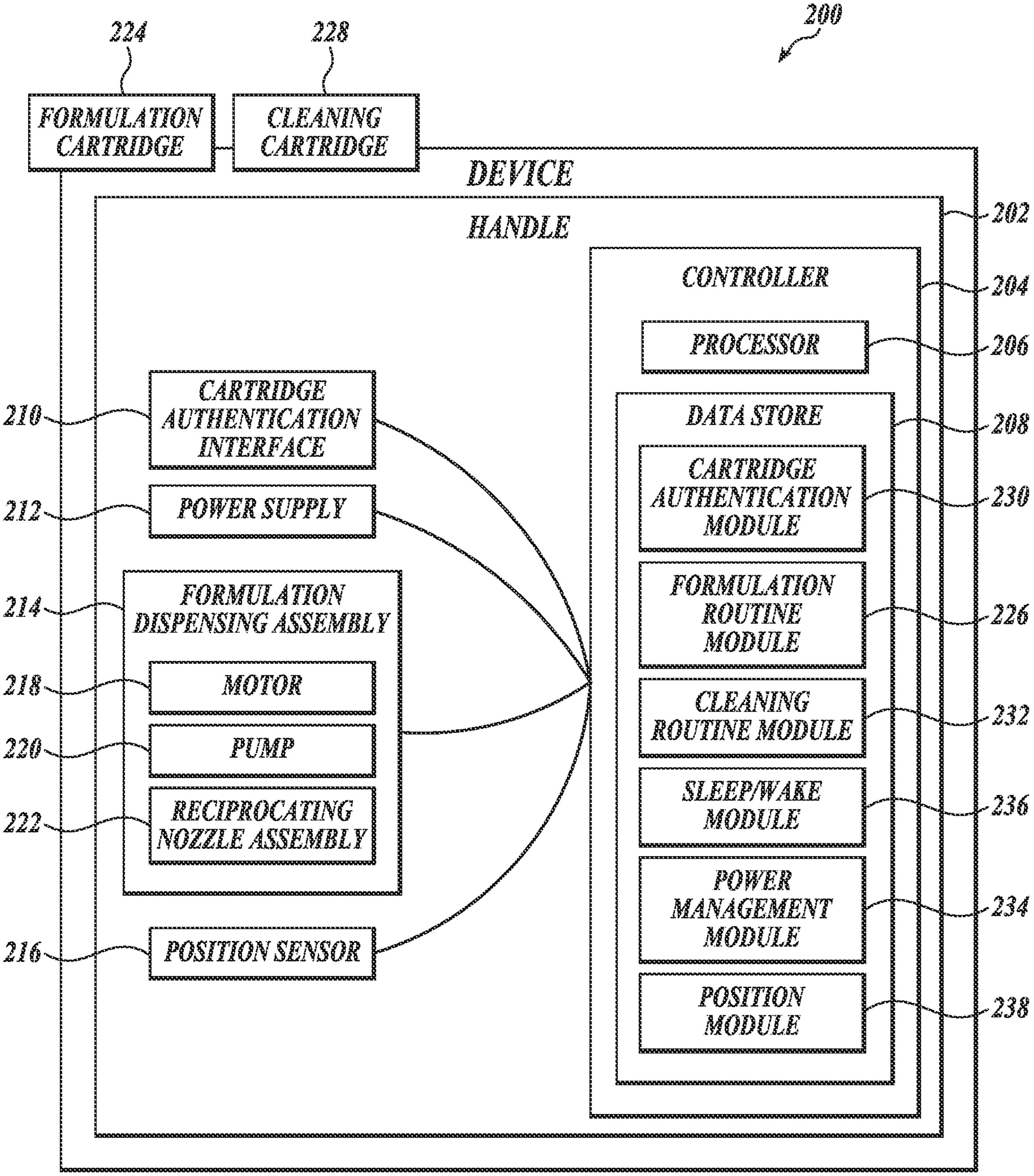
FIG. 2 shows a schematic overview of a formulation delivery device, in accordance with a representative embodiment of the present disclosure.

FIG. 2 shows a schematic overview of a representative formulation delivery device 200, to facilitate understanding of certain representative features thereof. The formulation delivery device 200 shall be understood to have the same features as the formulation delivery device 104 of FIG. 1

Formulation delivery device 200 includes a reusable handle 202 having a hollow elongate portion configured to reversibly receive the common formulation cartridge type (including the cleaning cartridge 112). Reusable handle 202 also houses a number of sub-assemblies, including a controller 204, which includes a processor 206 and data store 208 storing a number of modules (described below), cartridge authentication interface 210, power supply 212, formulation dispensing assembly 214, and an optional position sensor 216.

Power supply 212 is, in some embodiments, a direct current (DC) power supply, such as a rechargeable battery (e.g., a lithium ion battery) configured to be charged by plugging into a household alternating current outlet. In other embodiments, power supply 212 is an alternating current (AC) power supply, such as common household alternating current that utilizes an electrical cord (not shown) to supply power to the formulation delivery device 200. In some embodiments, the battery is configured to adjust current and or the amplitude of power based on the temperature of the battery. In some embodiments, the battery includes a battery manager to adjust the current or amplitude based on the temperature of the battery.

Formulation dispensing assembly 214 provides formulation and/or cleaning liquid from the formulation cartridge 110 to a user's scalp or hair. In an embodiment, formulation dispensing assembly 214 includes: a first fluid conduit fluidically connected to a first formulation inlet (which couples with a first liquid output nozzle of the formulation cartridge 110), a second fluid conduit fluidically connected to a second formulation inlet (which couples with a second liquid output nozzle of the formulation cartridge 110), a motor 218, a pump 220 driven by the motor 218, and a reciprocating nozzle assembly 222 which is also driven by the motor 218.

Cartridge authentication interface 210 is an RFID reader, a nearfield reader, or the like, which is positioned in the reusable handle 202 such that when the formulation cartridge 110 is inserted therein, the cartridge authentication interface 210 reads an encryption chip disposed on the formulation cartridge 224, in order to authenticate the formulation cartridge in connection with the formulation routine module 226 described below.

Optional position sensor 216 includes one or more sensors that, alone or collectively, aid in the determination of the position and orientation of formulation delivery device 200 relative to a user's scalp or hair. In some embodiments, position sensor 216 includes one or accelerometers, touch sensors (e.g., capacitive touch sensors), proximity sensors (e.g., optical proximity sensors), or the like. Signals transmitted from the position sensor 216 are used by the controller 204, and certain modules thereof, in order to improve the accuracy and efficiency of formulation application to a user's hair or scalp.

Controller 204 is operatively connected (e.g., electrically connected, electro-optically connected, optically connected, and the like) to the power supply 212, cartridge authentication interface 210, formulation dispensing assembly 214, and optional position sensor 216. Controller 204 includes the processor 206 (e.g., a general processing unit, graphical processing unit, central processing unit, application specific integrated circuit or the like), data store 926 (a tangible machine-readable storage medium), a plurality of modules implemented as software logic (e.g., executable software code, one or more algorithms, etc.), firmware logic, hardware logic, or various combinations thereof. In some embodiments, controller 204 includes a transceiver that transmits signals from any of the modules discussed below to the mobile device, and receives signals transmitted from the mobile device.

In some embodiments, controller 204 includes a communications interface having circuits configured to enable communication with the formulation delivery system, including formulation cartridge 224 (an encryption chip), cleaning cartridge 228, cartridge authentication interface 210, a mobile device and an application stored thereon, and/or other network element via the internet, cellular network, RF network, Personal Area Network (PAN), Local Area Network, Wide Area Network, or other network. Accordingly, the communications interface may be configured to communicate using wireless protocols (e.g., WIFI®, WIMAX®, BLUETOOTH®, ZIGBEE®, Cellular, Infrared, Nearfield, etc.) and/or wired protocols (Universal Serial Bus or other serial communications such as RS-216, RJ-45, etc., parallel communications bus, etc.). In some embodiments, the communications interface includes circuitry configured to initiate a discovery protocol that allows controller 204 and other network element (e.g., the formulation cartridge 110) to identify each other and exchange control information (e.g., identity of the formulation stored in the formulation cartridge 110). In an embodiment, the communications interface has circuitry configured to a discovery protocol and to negotiate one or more pre-shared keys.

Data store 208 is a tangible machine-readable storage medium that includes a mechanism that stores information in a non-transitory form accessible by a machine (e.g., processor 206, or mobile device 114). For example, a machine-readable storage medium includes recordable/non-recordable media (e.g., read only memory (ROM), random access memory (RAM), magnetic disk storage media, optical storage media, flash memory devices, etc.).

The modules described below are representative, not limiting. Accordingly, some embodiments of the controller 204 include additional modules, while other embodiments include fewer than all modules.

Cartridge authentication module 230 communicates with the cartridge authentication interface 210 in order to authenticate any formulation cartridge 224 or cleaning cartridge 228 which is inserted into the reusable handle 202. For example, upon insertion of the formulation cartridge 224 into the reusable handle 202, the cartridge authentication interface 210 reads an encrypted information from an encryption chip disposed on the formulation cartridge 224. If the cartridge authentication interface 210 successfully reads the encrypted information from the encryption chip, then the cartridge authentication module 230 "unlocks" the formulation delivery device 200, e.g., the formulation routine module 226. If, however, the cartridge authentication interface 210 cannot successfully authenticate the formulation cartridge inserted into the reusable handle 202, then it does not unlock the formulation delivery device 200. For example, if the formulation cartridge is a counterfeit cartridge or another cartridge containing inferior formulation, then the cartridge authentication module 230 does not unlock the functionality of the formulation delivery device 200. In this way, the cartridge authentication module 230 advantageously prevents the user from being harmed or having a poor experience.

Cartridge authentication module 230 is configured, in some embodiments, to read additional information from the encryption chip, including one or more of: a formulation identification, a beginning formulation quantity, a formulation expiration date, or a formulation production date. In such embodiments, cartridge authentication module 230 transmits the additional information to other modules for subsequent use.

Formulation routine module 226 stores a plurality of formulation routines for different formulations (e.g., haircare formulation routines), and causes the formulation dispensing assembly 214 to execute one or more formulation routines, based upon the formulation cartridge 224 authenticated by the cartridge authentication module 230. A formulation routine dispenses the authenticated formulation 108 from the formulation cartridge 224 through the reciprocating nozzle assembly 222. For example, a haircare formulation routine activates and causes the formulation dispensing assembly 214 to dispense one or more haircare formulations from the reciprocating nozzle assembly 222, for a particular dispensation time, at a particular liquid flow rate of the pump, nozzle reciprocating frequency and/or reciprocating amplitude of the reciprocating nozzle assembly 222, and/or other device operating parameter specified by the formulation routine stored in the formulation routine module 226. In this way, the formulation delivery device 200 adjusts one or more device operating parameter based upon the specific formulation stored in the authenticated formulation cartridge 224 inserted into the formulation delivery device, for more effective hair and scalp treatment.

In some embodiments, formulation routine module 226 determines, based upon a dispensed time of the authenticated formulation, a dispensed volume of the authenticated formulation from the formulation cartridge through the formulation dispensing assembly. Based upon the dispensed time and/or dispensed volume, the formulation routine module 226 causes a visual indicator on the reusable handle 202 to signal a remaining formulation quantity. This helps the user anticipate when the formulation cartridge will need to be replaced and prompts the user to utilize the e-commerce module of the connected application to conveniently procure additional formulation cartridges.

In an embodiment, formulation routine module 226 determines a mixed formulation ratio responsive to one or more inputs parameters from the cartridge authentication module 230, indicative of an authentication or authorization. In an embodiment, formulation routine module 226 causes the formulation dispensing assembly 214 to dispense a mixed formulation having a ratio determined responsive to one or more inputs parameters indicative of an authentication or authorization. In an embodiment, the formulation routine module 226 determines a mixture ratio between of a first formulation and at least a second formulation responsive to one or more inputs parameters indicative of an authentication or authorization.

Cleaning routine module 232 stores a cleaning routine, and causes the formulation dispensing assembly 214 to execute the cleaning routine after the cleaning cartridge 228 (which has a reservoir filled with a cleaning liquid) is inserted into the reusable handle 202 and authenticated by the cartridge authentication module 230. The cleaning routine dispenses the cleaning liquid from the authenticated cleaning cartridge 228 through the reciprocating nozzle assembly 222 (e.g., for a predetermined time and at a predetermined flow rate), in order to evacuate any residual formulation within the formulation dispensing assembly 214. The cleaning routine is useful, for example, after one formulation has been utilized in the formulation delivery device 200, but before a second, different formulation is utilized. In some embodiments, the cleaning routine operates the pump 220 at a higher flow rate than one or more (or all) formulation routines stored by the formulation routine module 226, in order to clear all residual formulation.

In some embodiments, controller 204 is configured to toggle between at least a cleaning routine (provided by the cleaning routine module 232) and a formulation routine (provided by the formulation routine module 226) responsive to one or more inputs indicative of the cleaning cartridge or the formulation cartridge inserted into the reusable handle. Representative inputs include an authentication of the formulation cartridge or cleaning cartridge provided by the cartridge authentication module 230.

According to a method of the present disclosure, a method of cleaning any of the formulation delivery devices includes inserting the cleaning cartridge at least partially filled with the cleaning liquid into the reusable handle of the formulation delivery device, and executing the cleaning routine until the cleaning liquid dispensed through the formulation dispensing assembly runs clear.

Power management module 234 provides power from the power supply 212 to one or more of the controller 204, cartridge authentication interface 210, formulation dispensing assembly 214, or the position sensor 216. Additionally, power management module 234 conserves available power resources (e.g., conserves battery life) by toggling the formulation delivery device 104 in between a sleep state (a passive state) and an awake state (an active state).

Sleep/awake module 236 manages whether the formulation delivery device 200 is in an awake state or a sleep state. The formulation delivery device 200 is in a sleep state by default, whereby little to no power is provided from the power supply 212 to the formulation dispensing assembly 214, cartridge authentication interface 210, and/or controller 204. In the sleep state, the formulation delivery device 200 is incapable of executing a formulation routine or cleaning routine. In the awake state, by comparison, the controller 204, cartridge authentication interface 210, formulation dispensing assembly 214, and position sensor 216 are sufficiently powered such that the formulation delivery device 104 is able to execute one or more formulation routines or cleaning routines. In some embodiments, the formulation delivery device 104 is "awakened," i.e., brought from the sleep state to the awake state, by: a push of a button disposed on the reusable handle 202, or by insertion of a formulation cartridge 224 or cleaning cartridge 228 into the reusable handle 202. In some embodiments, the formulation delivery device 200 returns to the sleep state after a predetermined inactivity period (e.g., 120 seconds of inactivity).

Position module 238 utilizes a position signal provided by the position sensor 216 to determine the position of the formulation delivery device 200, which position information is then provided to the formulation routine module 226 in order to facilitate execution of a formulation routine, e.g., a calibration routine. In some embodiments, the position module 238 provides the position signal to an application stored on a mobile device (via the transceiver), e.g., to enable execution of a calibration routine (described below) and/or to enable the application to display a correct application indication based upon the position signal.

Figure 3:
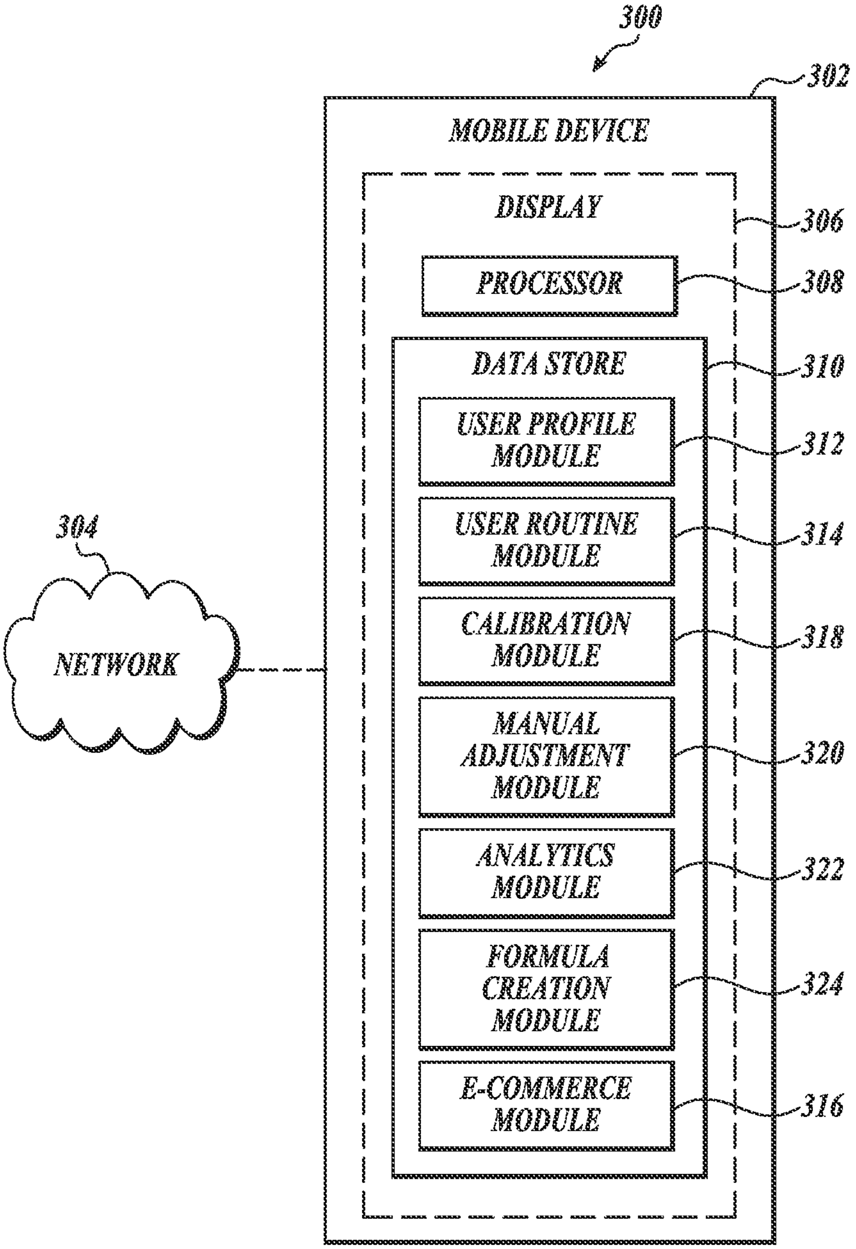
FIG. 3 shows a schematic overview of an application of a formulation delivery system, in accordance with a representative embodiment of the present disclosure.

FIG. 3 shows a schematic overview of a representative application 300, which shall be understood to have all feature of application 106 of FIG. 1 and is compatible with all formulation delivery systems and formulation delivery devices of the present disclosure. As noted above, the application 300 is configured to operate on a device, for example a mobile device such as a smartphone or a tablet. As one representative example, the application 300 is described in the context of a mobile device 302 connected to a network 304; however, this is not limiting.

Mobile device 302 has a display 306 (e.g., an LED or LCD display), a processor 308, and a data store 310 storing a plurality of modules. The terms "processor," "data store," and "module" have the same meaning as described above with respect to the controller 204, and as used below in connection with representative formulation delivery devices.

Each module described below presents one or more user interfaces on the display 306. The display 306 is a touch-sensitive display that is configured to receive user inputs thereon. Accordingly, for each module, the user interface presented on the display 306 is configured both to display information and to receive user inputs.

Application 300 includes a number of modules which personalize the user experience, including a user profile module 312 and user routine module 314. The modules described below are representative, not limiting. Accordingly, some embodiments of the application 300 include additional modules, while other embodiments include fewer than all modules.

User profile module 312 builds one or more profiles for users of the formulation delivery device 104. These profiles are provided as inputs to other modules, for example the user routine module 314 and the e-commerce module 316. Accordingly, the user profile module 312 provides one or more user interfaces that prompt a user to provide one or more user profile inputs, including: a hair color, a hair type (e.g., curly, straight), a colored/not colored state, an ethnicity, a hair condition (e.g., damaged), a scalp condition (e.g., itchy), and/or an age. The user profile module 312 accepts and stores the user profile inputs.

In some embodiments, user profile module 312 communicates with user routine module 314 by providing one or more of the user profile inputs, or an entire user profile, to the user routine module 314. The user routine module 314 then utilizes one or more of the user profile inputs to create one or more user-specific routines for the user and/or to select one or more tutorials to present on the display 306.

In some embodiments, user profile module 312 communicates with formulation delivery device 104. For example, in some embodiments, the user profile module 312 adjusts at least one device operating parameter of a formulation routine (e.g., flow rate, dispense time, reciprocating amplitude, or reciprocating frequency) generated by the formulation routine module based upon one or more of the user profile inputs.

User routine module 314 helps the user effectively utilize the connected formulation delivery device by, in some embodiments, formulating one or more user-specific routines for each user based upon one or more user profile inputs. That is, the user routine module 314 builds a new formulation routine (rather than selecting a predetermined formulation routine) in order to effectively treat one or more conditions identified by the user profile inputs or to achieve one or more goals identified by the user profile inputs. As one representative example, where user inputs indicate that the user's hair is both colored and damaged, the user routine module 314 builds a user-specific routine that selects an appropriate hair repair formulation and shampoo formulation for the user's hair color from the formulation product line, and displays the user-specific routine (e.g., as instructions) for utilizing the selected hair repair formulation and shampoo at an interval in determined to improve the health of the user's hair.

In addition, user routine module 314 displays on the display 306: a) one or more passive tutorials for formulation routines, cleaning routines, and/or calibration routines; and/or one or more active instruction sets that instruct the user, as the user uses the formulation delivery device.

In some embodiments, the user routine module 314 receives one or more of the user profile inputs, or an entire user profile, from the user profile module 312, and then displays a passive tutorial (e.g., a pre-recorded instructional video) that is targeted at the user based upon the received user profile inputs or the user profile. As one example, the user routine module 314 receives a user profile input from the user profile module 312 indicating that the user has colored hair, and displays a tutorial on the display 306 showing the user how to use the formulation delivery device to color the user's hair.

In some embodiments, the user routine module 314 receives one or more position signals from the position sensor of the formulation delivery device via the controller. Based upon the received position signals, the user routine module 314 instructs the user how to use the formulation delivery device as the user uses the device (e.g., instructions to move the formulation delivery device in a particular direction, at a particular speed, in a particular pattern, to a particular spatial boundary). As one example, the user routine module 314 receives a position signal from the position sensor indicating that the formulation delivery device is positioned at a user's left temple; based upon this received position signal, the user routine module 314 displays a video instructing the user to apply a scalp treatment formulation by moving the formulation delivery device from the left temple to the right temple while dispensing the scalp treatment formulation.

In some embodiments, user routine module 314 receives a position signal from the formulation delivery device and displays a correct application indication based upon the position signal.

Calibration module 318 helps the user calibrate the formulation delivery device, which in turn increases the efficacy of formulation routines executed by the formulation delivery device. In some embodiments, the calibration module 318 displays a passive tutorial (e.g., a pre-recorded instructional video) that instructs the user how to complete a calibration routine. In some embodiments, the calibration module 318 provides one or more active instruction sets that instruct on how to use the complete a calibration routine as the user uses the formulation delivery device, and as the calibration module 318 receives position signals from the formulation delivery device.

According to one representative calibration routine, the calibration module 318 instructs the user to position the formulation delivery device at a plurality of calibration locations of a body portion of the user, e.g., in a particular order (e.g., a left temple, then a right temple, then a front hairline, and then a rear hairline). The user then moves the formulation delivery device to each of the calibration locations, indicating with a press of a button on the formulation delivery device or other action when the formulation delivery device is at the specified calibration location, and/or while the user moved the formulation delivery device from one calibration location to another.

Based upon position signals received from the position sensor of the formulation delivery device, the calibration module 318 and/or the formulation delivery device records the calibration locations. Then, the calibration module 318 and/or the formulation delivery device adjusts one or more user-specific routines based upon the recorded calibration locations. In some embodiments, this adjustment step includes adjusting a spatial limit and/or a temporal duration of one or more formulation routines stored in the formulation routine module).

Manual adjustment module 320 enables a user to manually adjust one or more device operating parameter of the formulation delivery device (e.g., flow rate, dispense time, reciprocating amplitude, or reciprocating frequency), for the advantage of greater control over the formulation delivery device and a more customized user experience. Accordingly, the manual adjustment module 320 presents a user interface with one or more user-adjustable and virtual sliding scales, switches, editable value fields, and the like, which are configured to receive one or more operating parameter inputs from the user. The manual adjustment module 320 receives the operating parameter inputs and transmits said operating parameter inputs to the formulation delivery device (e.g., the formulation routine module), which adjusts the corresponding device operating parameter based upon the corresponding operating parameter input (e.g., to match the operating parameter input).

Analytics module 322 receives device operating parameters (e.g., from formulation delivery device and computes helpful analytics, which the analytics module 322 then provides to the user via the user interface and/or to a third party via the network 304. Representative analytics include: a formulation usage pattern, a formulation purchase prediction, and diagnostics of the formulation delivery device. In some embodiments, analytics module 322 communicates with network 304 (e.g., an analytic platform disposed on one or more cloud-based servers) to retrieve additional information and/or to compute said analytics.

In some embodiments where the formulation delivery device comprises a position sensor that sends a position signal to the controller, and a transceiver that send the position signal to the mobile device. The formulation delivery device transmits the position signal to analytics module 322, which retrieves a user suggestion from an analytic platform on the network 116 based upon the received position signal and displays the user suggestion.

Formula creation module 324 enables a user to create a custom formulation based upon a user's selection of one or more formulation inputs, which correspond to one or more desired outcomes (e.g., desired hair color), one or more formulation inputs (e.g., an indication that the user's hair is damaged), and/or one or more of the user profile inputs provided to the user profile module 312. Accordingly, the formula creation module 324 is configured to receive one or more user profile inputs from the user profile module 312, and to formulate a custom formulation based upon those inputs.

To facilitate the user's creation of the custom formulation, formula creation module 324 provides a user interface with one or more user-adjustable and virtual sliding scales, switches, editable value fields, and the like corresponding to each formulation input. In some embodiments, formula creation module 324 communicates with network 304 (e.g., a database of formulations disposed on one or more cloud-based servers) to retrieve additional information and/or to formulate said custom formulation.

E-commerce module 316 presents a purchase interface that enables a user to purchase (including on a one-time or subscription basis) products related to the formulation delivery device. In some embodiments, e-commerce module 316 retrieves one or more custom formulations from formula creation module 324 (or components thereof) and presents on the purchase interface an option for the user to purchase one or more formulation cartridges 110 containing the custom formulation. In some embodiments, e-commerce module 316 retrieves one or more user profile inputs and/or user-specific routine inputs from user profile module 312 and presents on the purchase interface an option for the user to purchase one or more formulation cartridges containing the formulations which target the user profile inputs (for example, where the user inputs indicate damaged hair, a formulation cartridge containing a hair repair formulation). In some embodiments, e-commerce module 316 presents on the purchase interface an option to purchase the cleaning cartridge 112 or formulation delivery device 104 and/or components thereof. Such purchase interface and purchase options may be based upon a formulation usage pattern and/or a formulation purchase prediction retrieved from the analytics module 322.

Figure 4:
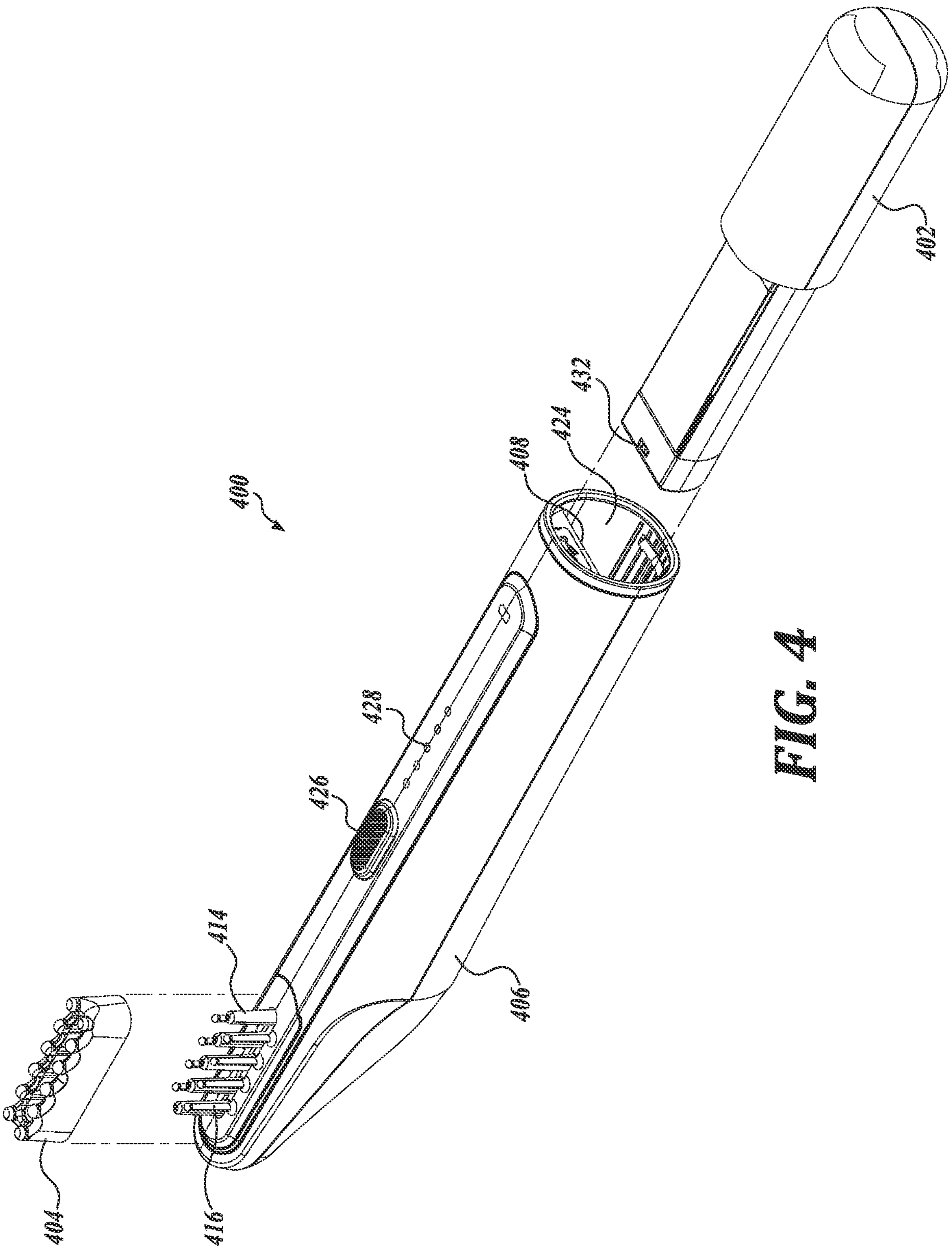
FIG. 4 shows an exploded perspective view of a formulation delivery device, in accordance with a representative embodiment of the present disclosure.
Figure 5:
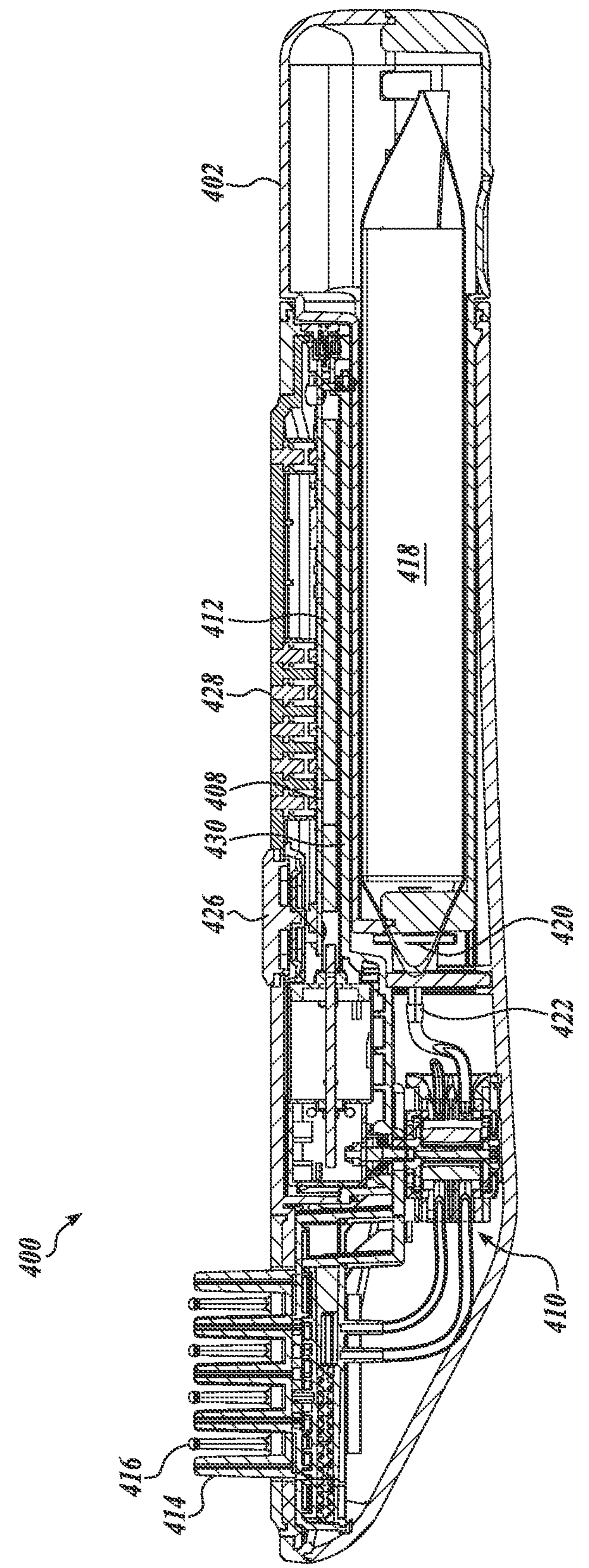
FIG. 5 shows a side section view of the formulation delivery device of FIG. 4, in accordance with a representative embodiment of the present disclosure.

FIGS. 4-5 show a representative formulation delivery device 400, and components thereof, in accordance with an embodiment of the present disclosure. The formulation delivery device 400 is configured to receive a formulation cartridge 402 type (including a cleaning cartridge of the same type). An embodiment of a formulation cartridge of the formulation cartridge 402 type is described below in detail with respect to FIG. 8A-FIG. 10; the formulation cartridge 402 shown in FIG. 4 shall be understood to have the same features as described there. Some embodiments of formulation delivery device 400 include the formulation cartridge 402 and/or an optional pull through adaptor 404.

Formulation delivery device 400 includes a reusable handle 406 formed from an ABS plastic or similar rigid polymer or other material, and in some embodiments is an assembly formed from a plurality of shells configured to be joined together with fastening elements such as snaps, screws, or the like. Reusable handle 406 has a hollow, elongate gripping portion with a cartridge cavity therein which is sized and dimensioned to receive the formulation cartridge 402 type. In some embodiments, the cavity includes keying features that facilitate correct insertion of the formulation cartridge 402 type. For example, some embodiments include a cartridge interface 408 disposed in the opening and having a flat docking surface that interfaces with a corresponding docking surface of the formulation cartridge 402 when the latter is correctly inserted into the opening.

Application 106 includes logic configured for operation on a non-transitory machine-readable storage medium, and includes modules that personalize the user experience, provide helpful analytics, and enable e-commerce. Application

106 runs on a mobile device 114 such as a smartphone, a tablet, or the like, and interacts with a user (e.g., an end user or a salon technician) to provide actionable information through a plurality of modules, which are described below with respect to FIG. 3. In some embodiments, the application 106 communicates with the formulation delivery device 104 and a network 116, such as a mobile network, a cloud-based enterprise network, a local area network, or the like.

Together, the formulation product line 102, formulation delivery device 104, and application 106 provide an improved, customized, user experience. Each of the foregoing elements of the formulation delivery system 100 will now be described in detail.

Formulation delivery device 104 is a connected electromechanical appliance that interacts with the user, with formulation cartridges 110, and optionally with the application 106 in order to provide a customized and personalized user experience. A representative formulation delivery device and sub-systems thereof are described below with respect to FIGS. 4-7.

Generally, formulation delivery device 104 comprises a reusable handle configured to receive the formulation cartridge 110 type, as well as a formulation dispensing assembly and a controller, both being disposed in the reusable handle. The formulation dispensing assembly comprises at least one fluid conduit fluidically connected to a motorized pump and to a reciprocating nozzle assembly, and is configured to draw formulation or cleaning liquid from the formulation cartridge 110 and to dispense the same through the reciprocating nozzle assembly onto a hair portion, scalp portion, or body portion of a user.

The controller is configured to toggle between at least a cleaning routine and formulation routine responsive to one or more inputs indicative of the cleaning cartridge or the formulation cartridge inserted into the reusable handle. The controller communicates with an encryption chip reader of a cartridge authentication interface in the reusable handle to read an encryption chip disposed on the formulation cartridge 110, in order to authenticate which formulation 108 is stored in the formulation cartridge 110 which is inserted into the reusable handle at any given time. In some embodiments, the controller also authenticates when the cleaning cartridge 112 is inserted into the reusable handle. Based upon the authenticated formulation 108 or cleaning cartridge 112, the controller causes the formulation delivery device 104 to execute a formulation routine that dispenses the authenticated formulation from the formulation cartridge through the formulation dispensing assembly. Based upon the authenticated cleaning cartridge 112, the controller also causes the formulation delivery device 104 to execute a cleaning routine that dispenses the cleaning liquid through the formulation dispensing assembly.

Reusable handle 406 houses a formulation dispensing assembly 410 (described below with respect to FIGS. 5-7), in addition to a controller 412. The formulation dispensing assembly 410 and controller 412 have the same features as the formulation dispensing assembly 214 and controller 204 of FIG. 2, respectively. An embodiment of a formulation dispensing assembly is described below in detail with respect to FIG. 6-FIG. 7; the formulation dispensing assembly 410 shown in FIG. 4 shall be understood to have the same features as described there.

Formulation dispensing assembly 410 dispenses formulation or cleaning liquid from the formulation cartridge 402, and includes a pump, fluid conduits, a mixing chamber, and a reciprocating nozzle assembly 414 (described below) with nozzles that extend away from the forward end of the reusable handle 406 in between a plurality of optional standoff portions 416. Reciprocating nozzle assembly 414 includes a plurality of annular nozzles that reciprocate back-and-forth along a track of the reusable handle 406 while dispensing formulation onto a user's skin or hair. In some embodiments, the reciprocating nozzle assembly 414 reciprocates at a reciprocating amplitude 7.0-12.0 mm (e.g., 8.0 mm-11.0 mm, or 9.0-10.0 mm) and/or at a reciprocating frequency of 5.0 Hz-10.0 Hz (e.g., 6.0 Hz-9.0 Hz, 6.0 Hz-8.0 Hz), which are adjustable by the formulation routine module, cleaning routine module, user routine module, manual adjustment module, or other module.

As shown in FIG. 5, formulation cartridge 402 has one or more formulation vessels 418 (e.g., pouches or packets) disposed therein, each of which has an output nozzle 420 protruding through a distal (forward) end of the formulation cartridge 402 in a configuration that fluidically connects with a corresponding formulation inlet 422 of the formulation dispensing assembly 410 when the formulation cartridge 402 is fully inserted into the cartridge cavity 424.

A button 426 disposed on the reusable handle 406 and electrically connected to the controller 412 activates features of the formulation delivery device 400 described above. In some embodiments, depressing the button 426 activates the features of any of the modules described above in FIG. 2. For example, in some embodiments, pressing button 426 activates a sleep/awake module stored in controller 412, thereby awakening formulation delivery device 400 from a sleep state to an awake state. In some embodiments, pressing button 426 while a formulation cartridge is inserted into the reusable handle 406 activates a formulation routine module stored in controller 412, thereby initiating a formulation routine.

In some embodiments, pressing button 426 while a cleaning cartridge is inserted into the reusable handle 406 activates a cleaning routine module stored in the controller 412, thereby initiating a cleaning routine. Visual indicators 428 (e.g., LEDs) disposed along the reusable handle 406 indicate one or more of a remaining formulation quantity or a remaining battery life, e.g., based upon a dispensed time determined by the formulation routine module of the controller. Some embodiments include additional buttons and/or a different number of visual indicators 428 with different functionalities, and the illustrated embodiment is not limiting. In some embodiments, visual indicator 428 is a multi-segment LED with each segment corresponding to an equal proportion of the formulation remaining in the formulation cartridge.

Controller 412 comprises logic (stored in a data store thereof), which when executed by a processor of the controller 412, causes a cartridge authentication interface 430 disposed in the reusable handle 406 (e.g., an RFID reader) to read an encryption chip 432 on the formulation cartridge 402 in order to authenticate the formulation cartridge 402. The encryption chip 432 stores at least one of the formulation cartridge 402, a formulation identification, a beginning formulation quantity, a formulation expiration date, or a formulation production date.

Controller 412 also comprises logic, which when executed, causes the formulation delivery device to execute, based upon authenticating the formulation cartridge 402, a formulation routine that dispenses a mixed formulation (of the first formulation and the second formulation) from the formulation cartridge 402 through the formulation dispensing assembly. For example, the formulation delivery device authenticates the first and second formulations after (or upon) insertion of a formulation cartridge into the reusable handle, and then, in response to pressing a button on the reusable handle, executes a formulation routine which causes formulation dispensing assembly 410 to continuously or continually mix the first and second formulations, and to dispense the same from the reciprocating nozzle assembly at one or more of the following predetermined device operating parameters for as long as the button is depressed: a formulation flow rate, a reciprocating frequency, or a reciprocating amplitude.

In some embodiments, controller 412 also comprises logic, which when executed, causes the formulation delivery device to execute, based upon authenticating a cleaning cartridge inserted into the reusable handles, a cleaning routine that dispenses a cleaning liquid through the formulation dispensing assembly. For example, the formulation delivery device authenticates a cleaning cartridge inserted into the reusable handle, and then, in response to pressing a button on the reusable handle, executes a cleaning routine which causes formulation dispensing assembly 410 to continuously or continually dispense a cleaning liquid (e.g., water) from the reciprocating nozzle assembly at one or more of the following predetermined device operating parameters for as long as the button is depressed: a cleaning liquid flow rate, a reciprocating frequency, or a reciprocating amplitude. In some embodiments, the cleaning liquid flow rate is higher than any formulation flow rate of one or more of the formulation routines stored in the controller 412, for the advantage of effectively flushing residual formulation from the formulation dispensing assembly.

Pull through adaptor 404 attaches to the reusable handle 406 over the reciprocating nozzle assembly 414. In some embodiments, pull through adaptor 404 provides an audible feedback signal upon correct engagement with the reusable handle 406.

Figure 6:
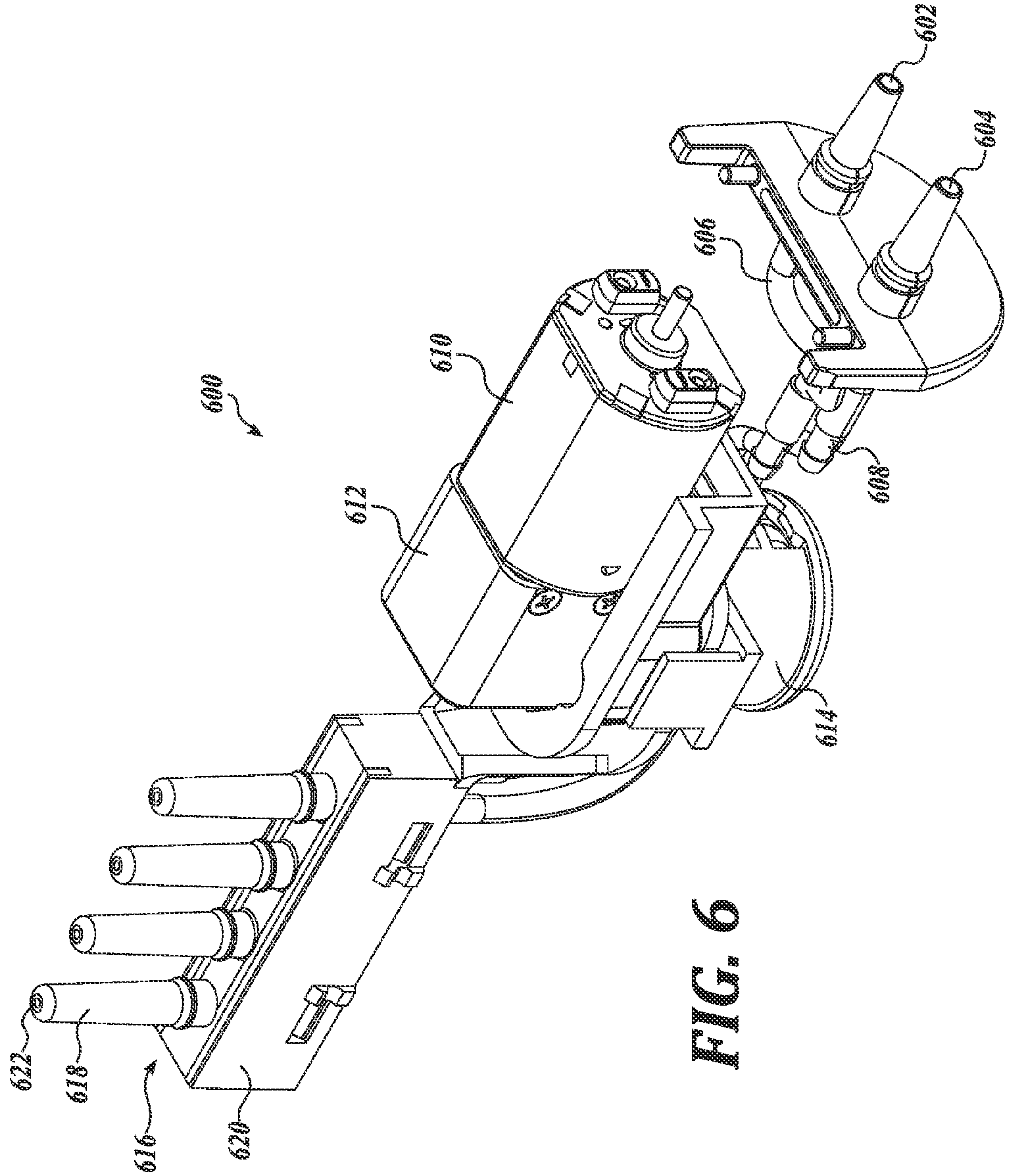
FIG. 6 shows a perspective view of a formulation dispensing assembly, in accordance with a representative embodiment of the present disclosure.
Figure 7:
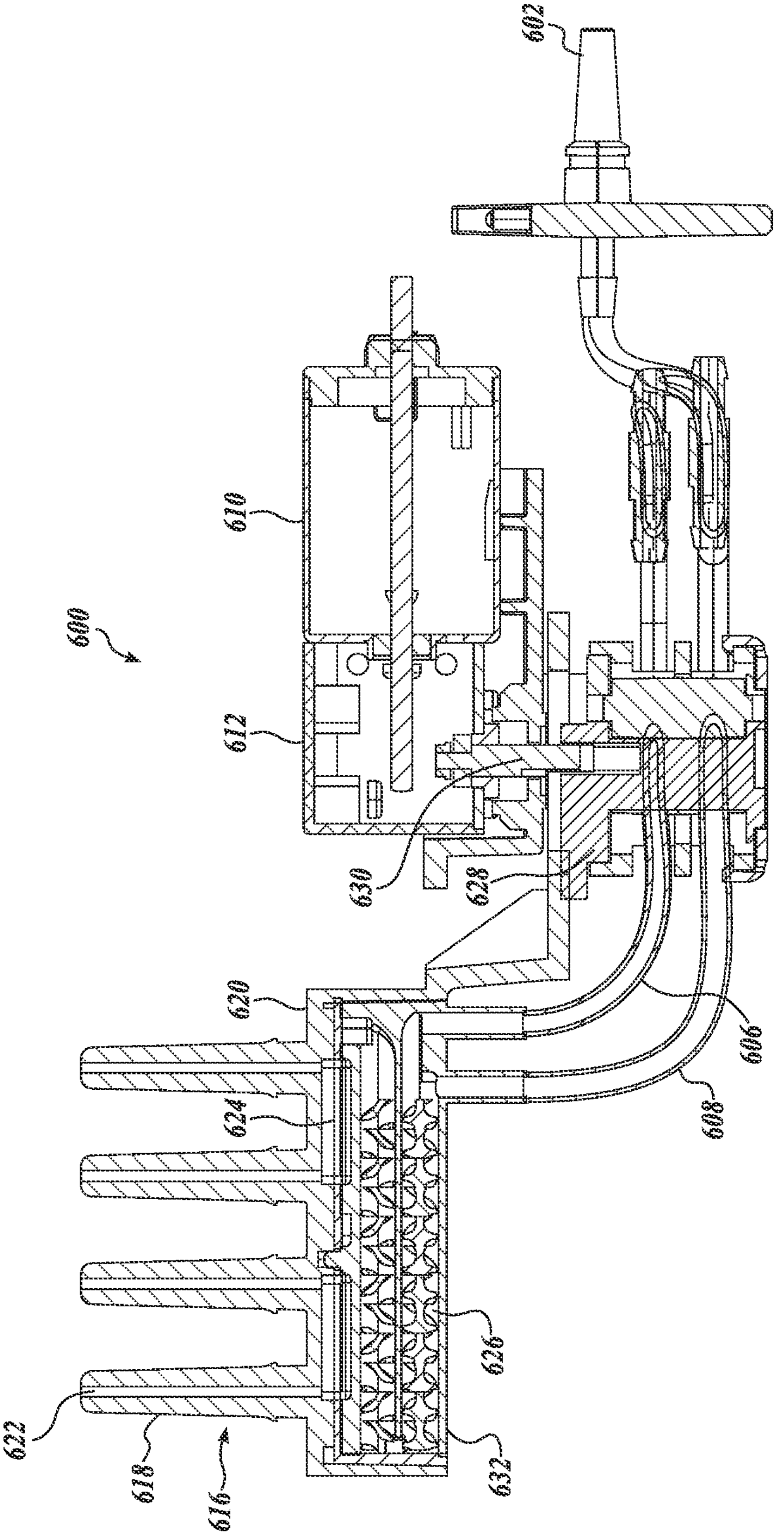
FIG. 7 shows a side section view of the formulation dispensing assembly of FIG. 6.

FIGS. 6-7 show a representative formulation dispensing assembly 600, which is compatible with any of the formulation delivery devices, formulation cartridges, and cleaning cartridges described herein. The primary function of the formulation dispensing assembly 600 is to dispense a mixed formulation of two different formulations from a formulation cartridge onto a user's skin or hair. In some embodiments, the formulation dispensing assembly 600 dispenses the mixed formulation at a flow rate of 20-40 mL/min or 120 mL per four minutes, e.g., 20-35 mL/min, 20-30 mL/min, 20-25 mL/min, 25-35 mL/min, 25-30 mL/min, or 35-40 mL/min.

Formulation dispensing assembly 600 includes a first formulation inlet 602 and a second formulation inlet 604, a first fluid conduit 606 and a second fluid conduit 608 fluidically connected to the first formulation inlet 602 and second formulation inlet 604, respectively. In some embodiments, each of the first formulation inlet 602 and second formulation inlet 604 are formed as protrusions extending rearwardly (i.e., toward the cartridge cavity when disposed in the reusable handle) from the first fluid conduit and the second fluid conduit, respectively, toward a rear end of the reusable handle, the protrusions being configured to project into the formulation cartridge.

The formulation dispensing assembly 600 also includes a motor 610, a gearbox 612 operatively connected to the motor 610, and a pump 614 driven by the motor 610 via the gearbox 612. In some embodiments, pump 614 is a peristaltic pump, which has been discovered to improve formulation dispensing when utilized in combination with the mixing chambers and tapered formulation channels described herein.

A reciprocating nozzle assembly 616 includes a plurality of annular nozzles 618 disposed on a comb 620, that, in use, cycles back-and-forth along a track of the reusable handle 406 while dispensing formulation onto a user's skin or hair, in order to achieve more uniform formulation coverage. Each of the nozzles 618 includes a formulation channel 622 therethrough, each of which is fluidically connected to the first fluid conduit 606 and second fluid conduit 608 via manifold 624. In some embodiments, each formulation channel 622 is tapered, for the advantage of increasing the formulation dispensing velocity and/or for further mixing the two formulations. The tapered formulation channel has proven advantageous when utilized in combination with other features described herein, e.g., wherein the pump 614 is a peristaltic pump and/or wherein the turbulent mixing chamber includes one or more helical mixers 626.

The motor 610 and gearbox 612 drive the reciprocating nozzle assembly 616 in linear reciprocating motion. In an embodiment, the linear reciprocating motion is motivated by an eccentric roller 628 coupled to an output shaft 630 of the gearbox 612, which eccentric roller 628 rotates inside an annular bracket of the comb 620. Driving the pump 614 and reciprocating nozzle assembly 616 with a common motor 610 improves power efficiency, reduces weight and size, thereby improving the form factor of the formulation delivery device. Nevertheless, some embodiments use more than one motor to drive the pump 614 and reciprocating nozzle assembly 616.

Nozzles 618 are fluidically connected to the first fluid conduit 606 and second fluid conduit 608 via a turbulent mixing chamber 632, which mixes a first formulation drawn from the formulation cartridge via the first fluid conduit 606 with a second formulation drawing from the formulation cartridge via the second fluid conduit 608 to create mixed formulation. In particular, the turbulent mixing chamber 632 mixes the two formulations by combining the same in a common chamber under pressure, and flowing the two formulations past one or more mixing elements, which create turbulent flow of the mixed formulation (as distinguished from laminar flow). The proportions of the first formulation to the second formulation vary in different embodiments. For example, is some embodiments, the mixed formulation is a mixture of a first formulation and a second formulation at a ratio of about 0.8:1.0-1.2:1.0, e.g., 0.85, 0.90, 0.95, 1.00, 1.05, 1.10, or 1.15.

In some embodiments, turbulent mixing chamber 632 is disposed between the pump 614 and the reciprocating nozzle assembly 616. In this configuration, the two formulations are mixed just before dispensing, which creates a more uniform formulation consistency and results in better formulation dispensation from the nozzles 618, as compared to mixing the formulations upstream of the pump 614.

In some embodiments, turbulent mixing chamber 632 includes a helical mixer 626 disposed therein. Some embodiments include a plurality of helical mixers 626 fluidically connected in series along a fluidic pathway within the turbulent mixing chamber 632, for improved mixing. In some embodiments, each helical mixer has an outside diameter between 2.00 mm and 5.00 mm, e.g., between 3.0 mm and 4.00 m, e.g., 3.18 mm. In some embodiments, each helical mixer has a total length of between 20.0 mm and 40.0 mm, e.g., between 25.0 mm and 35.0 mm, e.g., 33.0 mm. In some embodiments, each helical mixer has a length-to-diameter pitch (defined as total length/[outside diameter*#mixing elements]) between 0.75 and 1.25, e.g., between 0.80 and 0.90, e.g., 0.865. The combination of the foregoing specifications has been discovered to produce the best consistency of mixed formulation, particularly when the two formulations are not mixed until downstream of the pump 614, just upstream of the reciprocating nozzle assembly 616, and also when the pump 614 is a peristaltic pump.

In use, the pump 614 draws formulation from the connected formulation cartridge, through the first fluid conduit 606 and second fluid conduit 608, through the turbulent mixing chamber 632, through manifold 624, and through the nozzles 618. In the illustrated embodiment, the first fluid conduit 606 and second fluid conduit 608 are kept fluidically separate until downstream of pump 614, to prevent mixing of the two formulations until the turbulent mixing chamber 632. As stated previously, mixing the two formulations just before dispensation (i.e., between the pump 614 and manifold 624), improves the consistency of the mixed formulation.

FIGS. 8A-10 show a representative formulation cartridge 800 of a formulation cartridge type which is compatible with any of the formulation delivery systems, formulation delivery devices, and formulation product lines described herein. However, the formulation delivery systems, formulation delivery devices, and formulation product lines described herein are not required to use the sustainable formulation cartridge 800 shown in FIG. 8A-FIG. 10.

Formulation cartridge 800 is a sustainable embodiment specifically designed to reduce waste and environmental impact, while delivering a user-friendly experience. To that end, formulation cartridge 800 includes two main components: a handle portion 802 and a disposable formulation cartridge refill unit 804 (hereinafter referred to simply as refill unit 804) configured to reversibly slide into the handle portion 802. Historically, known cartridges were designed to be entirely disposed after depletion of the formulation stored therein, leading to significant waste and higher consumer cost.

In contrast to known cartridges, the formulation cartridge 800 is constructed such that the handle portion 802 can be reused indefinitely and the refill units 804 can be readily replaced after depletion of the formulation stored therein. Further still, each refill unit 804 is configured to be deconstructed into smaller components, some of which can be recycled in some embodiments, and others disposed of. Thus, the formulation cartridge 800 utilizes an innovative structure to reduce waste and improve the user experience.

Handle portion 802 is sized, dimensioned, and constructed to be repeatedly inserted into the cartridge cavity of the formulation delivery device. Accordingly, handle portion 802 is formed of ABS plastic or similar rigid polymer or other material and includes a hollow handle portion 802 configured to receive the refill unit 804 therein, and a tray portion 806 that extends away from handle portion 802. Handle portion 802 is a two-piece assembly in the representative embodiment shown (although it may be one-piece in other embodiments), and is sized and dimensioned such that it forms a seamless extension of the formulation delivery device handle when fully inserted into a cartridge cavity thereof. Tray portion 808 projects away from handle portion 802 and has a U-shape configured to support the refill unit 804 (e.g., the front body portion 810). To facilitate secure engagement and easy removal, handle portion 802 includes coupling means for coupling the formulation cartridge 800 to a reusable handle of a formulation delivery device. Representative coupling means include a cartridge release 812 (e.g., a latch) formed in the handle portion 802, which engages the formulation delivery device upon proper and complete insertion.

Thus, the common formulation cartridge 110 type enables a consumer to utilize many different formulations in a single formulation delivery device 104. A representative formulation cartridge 110 type is described below in FIG. 8A-FIG. 10, and a representative cleaning cartridge 112 is described in FIG. 12.

In a representative embodiment, the formulation product line 102 includes a hair coloring formulation and a scalp treatment formulation. In other representative embodiments, the formulation product line 102 comprises at least two, three, four, five, six, seven, or eight of the following different formulations, each of which is stored within the same formulation cartridge 110 type: a permanent hair dye and a developer; a semi-permanent hair dye and a developer; a shampoo; a conditioner; a hair growth treatment such as minoxidil; a hair protein treatment; a disulfide bond repairing hair treatment; or a fluid scalp treatment. In still further representative embodiments, the formulation product line 102 includes any of the above combinations, in addition to an optional cleaning cartridge 112 of the same formulation cartridge 110 type.

Formulation cartridge 110 type has an elongate shape and dimensions configured for insertion into a handle of the formulation delivery device 104, in particular into a cartridge cavity of the handle. In some embodiments of the formulation delivery system 100, the elongate outer housing has a different construction between formulation cartridges 110 containing formulation and the cleaning cartridge 112, but with common a common shape and dimensions. For example, in some embodiments, formulation cartridges 110 containing formulation have the construction of the partially recyclable embodiment shown in FIG. 8A-FIG. 10, while the cleaning cartridge 112 has similar shape and dimensions, but different materials and components.

Another feature of the formulation cartridge 110 type is a plurality of liquid output nozzles, which are sized and positioned at a distal (forward) end of the formulation cartridge 110 in a configuration that fluidically connects with a corresponding plurality of liquid inlets (e.g., first formulation inlets). In some embodiments, the liquid output nozzles are valves of formulation vessels (e.g., pouches or packets) disposed in the formulation cartridge 110.

A representative formulation cartridge 110 type, which is configured for insertion into formulation delivery device 104 and for storing a first formulation and a second formulation, is described below in FIG. 8A-FIG. 10.

Cleaning cartridge 112, which is of the common formulation cartridge 110 type (i.e., has common exterior dimension and a plurality of liquid output nozzles), enables a user to clean the formulation delivery device 104 by executing a cleaning routine that flushes a cleaning liquid (e.g., water) from the cleaning cartridge 112 through the fluid conduits of the formulation delivery device 104, thereby removing residual formulation in the formulation delivery device 104. Advantageously, the cleaning cartridge 112 and cleaning routine enable a significant portion of the formulation delivery device 104 to be reused for different formulations, thereby reducing waste and cost.

Cleaning cartridge 112 includes a refillable cleaning liquid reservoir disposed inside the outer housing, which is fluidically connected to the plurality of output nozzles. Thus, a user can fill the cleaning liquid reservoir with a cleaning liquid such as water, execute a number of cleaning routines on the formulation delivery device 104, and refill the cleaning liquid reservoir.

Figure 9A:
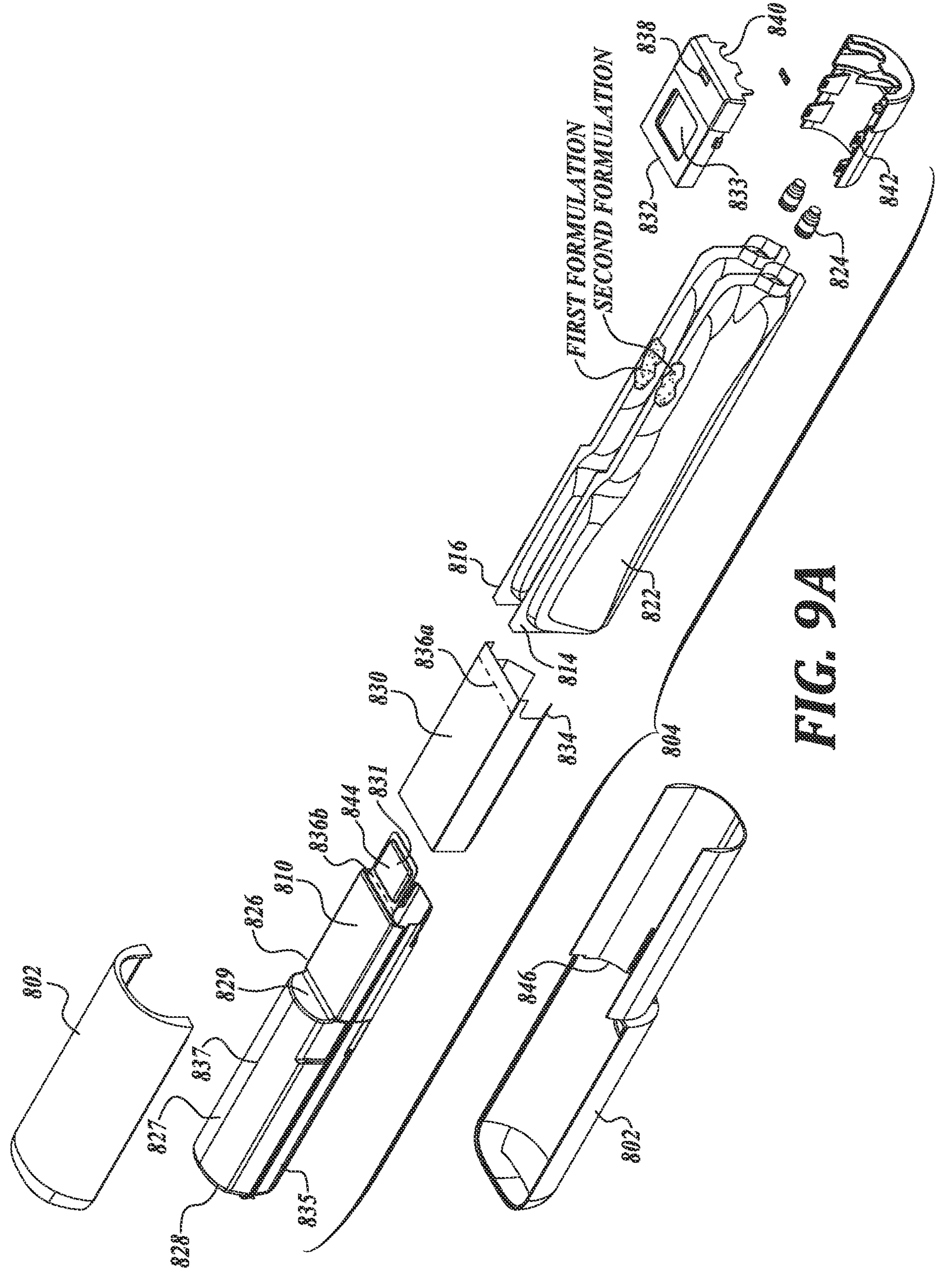
FIG. 9A shows an exploded perspective view of the formulation cartridge of FIG. 8A.
Figure 9B:
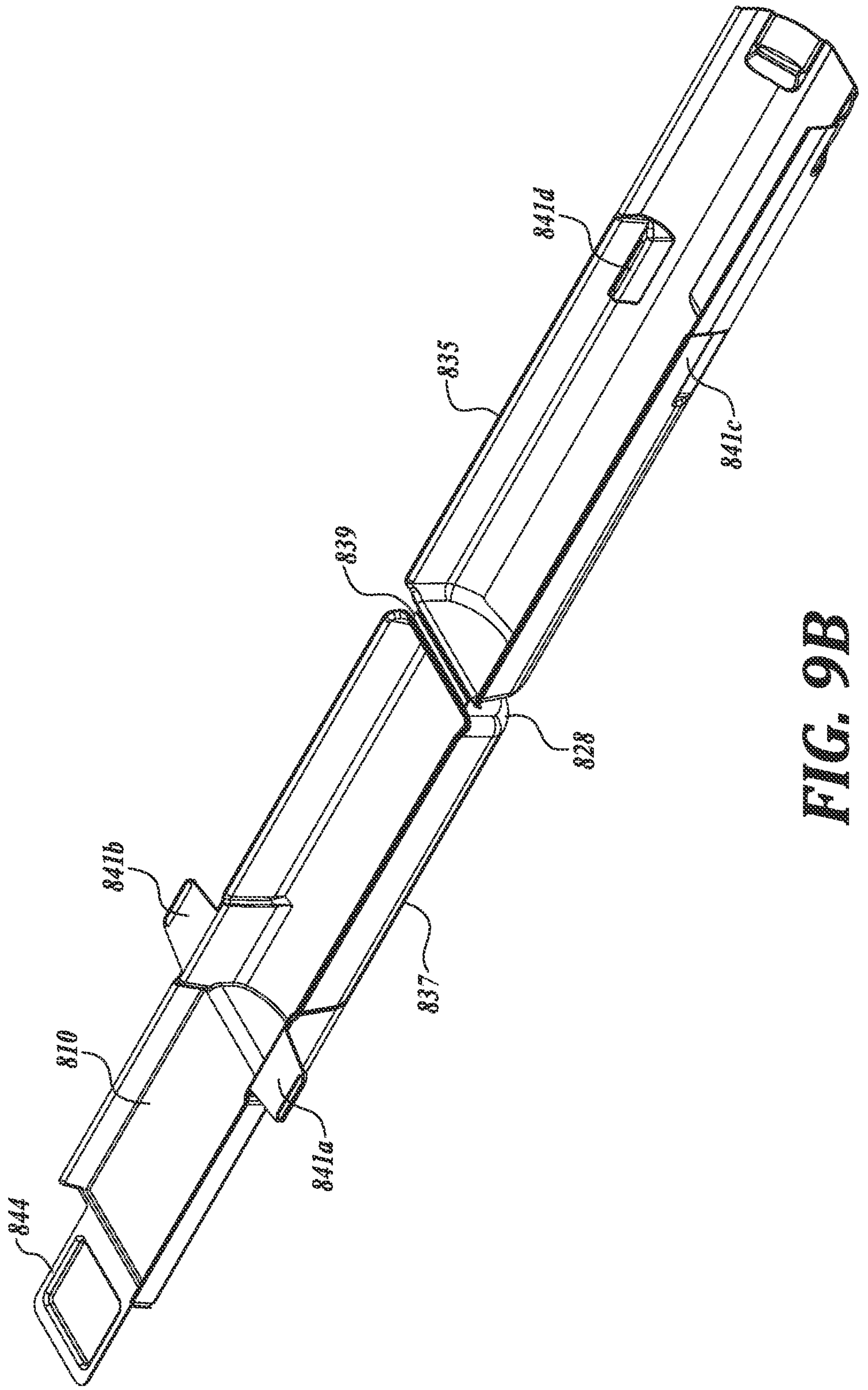
FIG. 9B shows a top view of a portion of the formulation cartridge of FIG. 8A.
Figure 10:
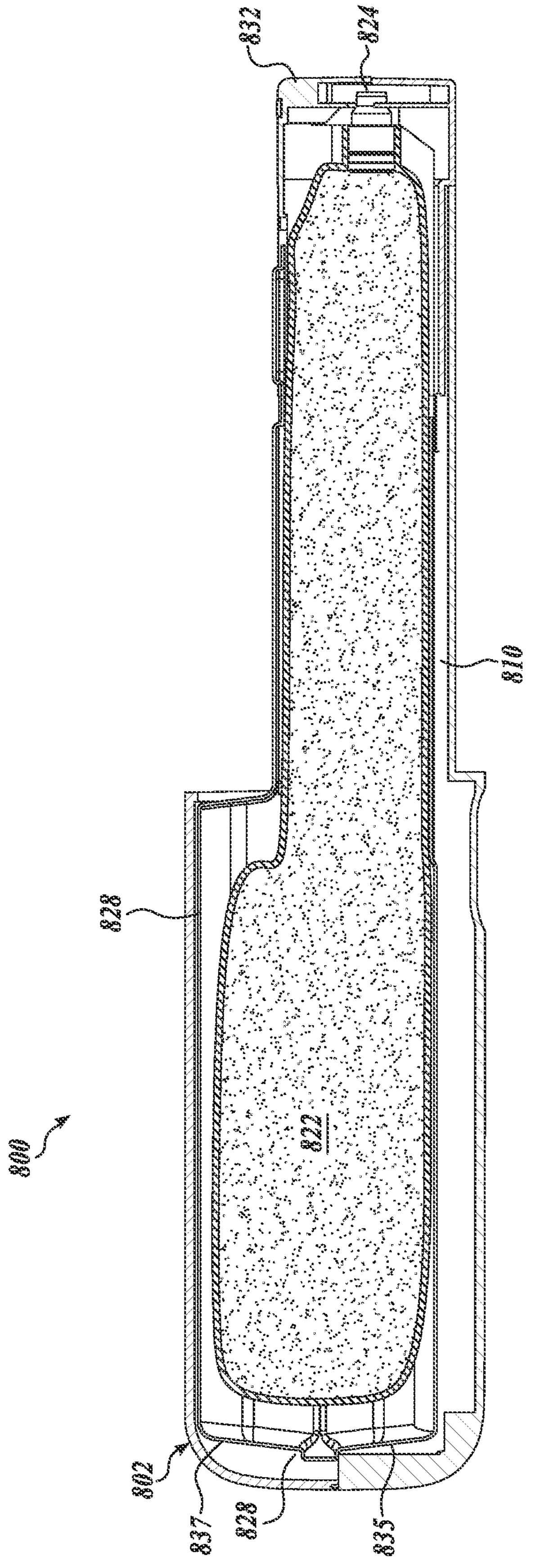
FIG. 10 shows a side section view of the formulation cartridge of FIG. 8A.

As best shown in FIG. 9A, refill unit 804 generally includes a refill packet comprising a shell 826 enclosing at least one formulation vessel (e.g., a packet, pouch, or other vessel), for example a first formulation pouch 814 and a second formulation pouch 816, and a valve frame 832 coupled with the refill packet, e.g., a front body portion 810 of the shell 826. The first formulation pouch 814 and second formulation pouch 816 respectively contain a first formulation 818 and a second formulation 820. The refill unit 804 may optionally include packet sleeve 830.

Each of first formulation pouch 814 and second formulation pouch 816 has a volume of about 40 mL to about 70 mL, about 50 mL to about 60 mL, about 40 mL to about 65 mL, about 40 mL to about 60 mL, about 40 mL to about 55 mL, about 40 mL to about 50 mL, about 45 mL to about 70 mL, about 50 mL to about 70 mL, about 55 mL to about 70 mL, about 60 mL to about 70 mL, or about 55 mL. In some embodiments, first formulation pouch 814 and second formulation pouch 816 have different volumes. In some embodiments, refill unit 804 stores only a single formulation vessel.

The first formulation 818 and second formulation 820 can each be any of the formulations described herein, for example a permanent hair dye; semi-permanent hair dye; developer; conditioner; hair growth treatment, such as minoxidil; hair protein treatment; disulfide bond repairing hair treatment; fluid hair treatment; fluid scalp treatment, or the like. In some embodiments, the first formulation 818 and second formulation 820 differ. For example, in some embodiments, the first formulation 818 is a hair dye and the second formulation 820 is a developer. In other embodiments, the first formulation 818 and second formulation 820 are the same (e.g., a conditioner or scalp treatment formulation). In some embodiments, the first formulation 818 is selected from the list above, and the second formulation 820 is a cleaning solution. In some embodiments, the first formulation pouch 814 and the second formulation pouch 816 are configured to be coupled to a valve selector, as shown in detail in FIG. 13 and FIGS. 16A-16D.

As shown in FIG. 9A, each formulation pouch 814, 816 includes a formulation-containing packet 822 and valve means for selectively-fluidic coupling the refill unit to a dispensing nozzle unit of a formulation delivery device when the formulation cartridge 800 is received within the hand-held formulation dispensing device. Representative valve means include a valve 824 through which the formulation exits the packet 822. Representative formulation vessels are described in International Patent Application Publication No. 2019/067336A2, published Apr. 4, 2019 and assigned to L'Oreal SA, and U.S. Patent Application Publication No. 2021/0196021A1, published Jul. 1, 2021 and assigned to L'Oreal SA, both of which are hereby incorporated by reference in their entireties for all purposes.

The shell 826 has an elongate shape sized to be received within the reusable handle portion 802. Shell 826 encloses and protects the first formulation pouch 814 and second formulation pouch 816 and engages the valve frame 832 (described below). Thus, shell 826 functions as packaging which protects the formulation pouches 814, 816 during commerce prior to loading into the formulation delivery device.

In some embodiments, shell 826 has a total length between 150 mm and 250 mm (e.g., 175 mm-225 mm, 185 mm-215 mm, 195 mm-205 mm, or 200 mm) and a maximum cross sectional dimension of 25 mm-50 mm (e.g., 30 mm-45 mm, 35 mm-40 mm, or 36 mm). Shell 826 has a rear body portion 828 and a slender front body portion 810, e.g., a neck portion, extending away from the body portion 828. The body portion 828 and the slender front body portion 810 generally align in a common longitudinal direction to enable assembly with the reusable handle portion 802, and to enable insertion into the cartridge cavity of the formulation delivery device.

In some embodiments, shell 826 is constructed at least partially from a recyclable or recycled material, e.g., a paper material such as an injection-molded paper material or a die-cut structured paper (e.g., cardboard). In the illustrated embodiment, the shell 826 is formed from a single piece of injection-molded paper material. In some embodiments in which the shell 826 is formed of paper, the paper has a weight between 8-12 points (e.g., 8.5 points, 9.0 points, 9.5 points, 10.0 points, 10.5 points, 11.0 points, or 11.5 points), to impart sufficient stiffness without contributing excess disposable material.

The rear body portion 828 of the shell 826 has a larger cross-sectional dimension than the front body portion 810 when viewed in a plane normal to the longitudinal direction of the cartridge 800. A hump or bulge 827 imparts the larger cross sectional area of the rear body portion 828 relative to the slender front body portion 810. Advantageously, the hump or bulge 827 enables the use of higher-volume formulation pouches 814, 816. Additionally, the hump or bulge 827 forms an abutment 829 which abuts a corresponding interior face of the handle portion 802 and secures the longitudinal position of the shell 826 during use.

The slender front body portion 810 of the shell 826 is sized to fit within the tray portion 806 of the handle portion 802 and to project into the cartridge cavity of the formulation delivery device during use. As shown best in FIG. 8A, the front body portion 810 couples with the valve frame 832. To facilitate secure connection and alignment with the valve frame 832, front body portion 810 includes valve frame coupling means, for example at least one coupling tab 844 configured to selectively engage the valve frame 832. In the illustrated embodiment, the front body portion 810 includes a single coupling tab 844 extending away from a front end thereof. The coupling tab 844 includes an engagement feature, for example a detent or raised prominence 831 shaped and sized to engage a complementary aperture 833 of the valve frame 832.

Shell 806 may have many different configurations. For example, referring to FIG. 9A and FIG. 9B together, the illustrated shell 806 is a clamshell configuration formed with at least two partial shells (in this embodiment, two halves 835, 837) hingedly coupled by a hinge 839, for example a living hinge integrally formed with the two halves. In the embodiment shown, the hinge 839 is disposed at distal end of the shell 806, i.e., at a distal end of each of half 835, 837. In other embodiments, the hinge may be disposed at a different location, e.g., along a longitudinal edge of the halves. In some embodiments, the shell 806 includes a different number of partial shells, e.g., three or four partial shells which come together to enclose the formulation pouches 814, 816. In still other embodiments, shell 806 comprises a single piece forming an open-ended tube into which the formulation pouches 814, 816 may be inserted.

Alignment of the halves 835, 837 enables correct attachment of the front body portion 810 to the valve frame 832. To this end, as shown best in FIG. 13 (deleted), the halves 835, 837 include optional complementary alignment means 841*a*-*d*, for example tabs and complementary slots. The alignment means shown are representative, not limiting. In other embodiments, the alignment means may include different fasteners, e.g., hook-and-loop fasteners. In still other embodiments, the partial shells may be configured to align with each other by friction fit or by other means. In addition to aligning the halves, alignment means 841*a-d* help hold the halves together.

While the illustrated shell 826 is formed of an injection molded paper material, this construction is representative, not limiting. In some embodiments, shell 826 is formed of a single piece of die-cut paper stock, which is folded to impart a three dimensional structure having the rear body portion 828 and slender neck portion 810 extending away therefrom. In some such embodiments, this folded construction creates a polygonal cross section in the rear body portion 828 and a polygonal cross section in the front body portion 810 (for example, octagonal and hexagonal cross sections, respectively). To facilitate assembly, some such embodiments of the shell 826 include one or more scores or guidelines that ensure correct folding. Some embodiments have a triangular, rectangular, pentagonal, hexagonal, heptagonal, octagonal, or other polygonal cross-sectional shape.

Optional packet sleeve 830 slides over the neck portion 810 and provides several important advantages. First, it imparts additional structure to the refill unit 804 by sliding over and reinforcing front body portion 810. Accordingly, in some embodiments, packet sleeve 830 has a greater weight or thickness as compared to the material that forms shell 826; although this is not required. In some embodiments, packet sleeve 830 is also formed of a recyclable material, which may be the same material as the shell 826.

Second, in some embodiments, packet sleeve 830 couples with the valve frame 832. For example, the illustrated packet sleeve 830 includes a plurality of engagement member recesses 834 configured to reversibly couple with engagement members of the valve frame 832.

Figure 8A:
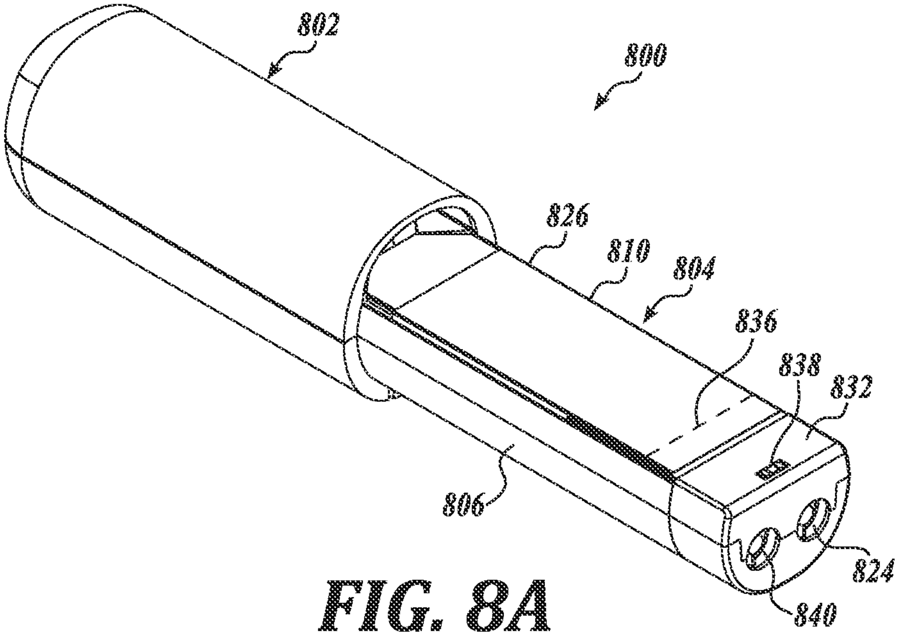
FIG. 8A shows a first perspective view of a formulation cartridge, in accordance with a representative embodiment of the present disclosure.
Figure 8B:
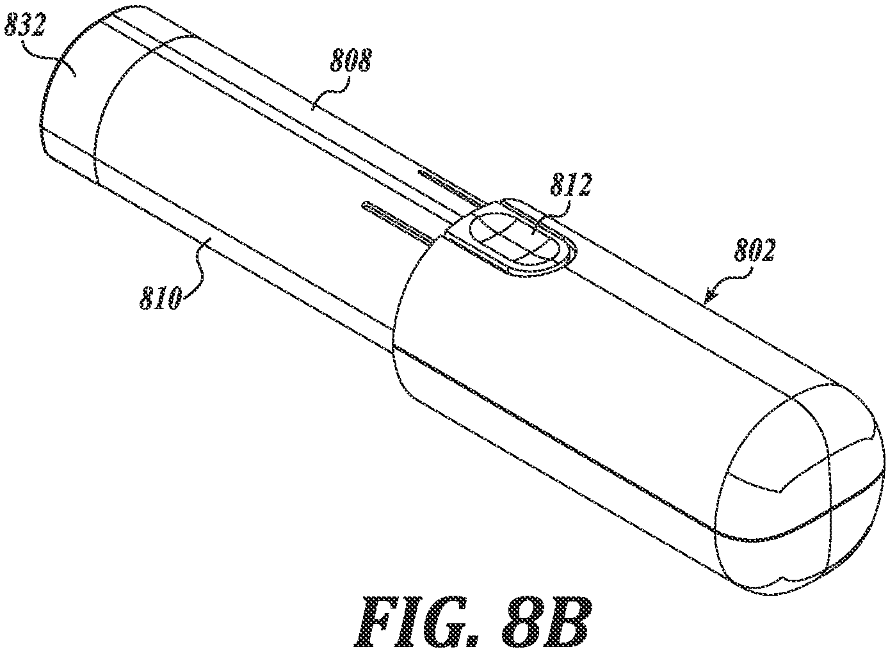
FIG. 8B shows a second perspective view of the formulation cartridge of FIG. 8A.

Third, packet sleeve 830 facilitates disassembly of the refill unit 804. As shown in FIGS. 8A and 9, in some embodiments, packet sleeve 830 includes an optional integral tearaway 836*a* formed thereon (e.g., a perforation with a pull tab). In other embodiments, the tearaway is formed on the neck portion 810 (see tearaway 836*b*). In use, after the formulation packets 814, 816 are depleted, a user pulls the pull tab of integral tearaway 836*a* and/or 836*b*, thereby separating valve frame 832 from packet sleeve 830. Upon completion of this action, the packet sleeve 830 is recycled and the valve frame 832 is discarded. In some embodiments, the integral tearaway 836 is disposed on the shell 826, e.g., the front body portion 810.

Valve frame 832 provides a rigid structure which aligns the formulation pouch valves 824 for correct fluid interconnection with the fluid conduits of the formulation delivery device. Additionally, in some embodiments, valve frame 832 supports an optional encryption chip 838 as described above. In such embodiments, valve frame 832 is sized and shaped to accurately position the encryption chip 838 adjacent to the cartridge authentication interface of the formulation delivery device when the formulation cartridge 800 is disposed in the handle of the formulation delivery device. Accordingly, valve frame 832 is formed from ABS plastic, HDPE, or other rigid polymer or other material. In some embodiments, valve frame 832 is formed from a same material as shell 806.

A plurality of valve engagement units 840 extend through a front end of the valve frame 832. Each valve engagement unit 840 receives and secures one of the formulation pouch valves 824. In some embodiments, the valve engagement unit 840 is a valve aperture or cutout disposed through a face of the valve frame 832, the valve aperture or cutout being sized to receive a valve of a formulation pouch and optionally to engage an outer circumference of the valve. To enable coupling with the packet sleeve 830 (or shell 826 in some embodiments), valve frame 832 includes optional engagement members 842 (e.g., tabs) extending therefrom. In some embodiments, valve frame 832 engages with the front body portion 810 by a friction fit.

Encryption chip 838 (e.g., an RFID tag) is disposed on the refill unit 804, e.g., on the body portion 826 or on the valve frame 832 (as in the illustrated embodiment). The encryption chip 838 is positioned on the refill unit 804 such that when the formulation cartridge 800 is inserted into the formulation delivery device, it is positioned to be read by the cartridge authentication interface thereof. Accordingly, the encryption chip 838 stores information about the formulation cartridge 800 and its contents, for example at least one of a formulation identification, a beginning formulation quantity, a formulation expiration date, or a formulation production date.

Thus, the shell 826, formulation pouches 814, 816, valve frame 832, and optional packet sleeve 830 form the refill unit 804. In use, refill unit 804 is reversibly couplable with handle portion 802, e.g., by securing means such as coupling tabs on the shell 826 or by friction fit between the refill unit 804 and the handle portion 802.

Figure 11:
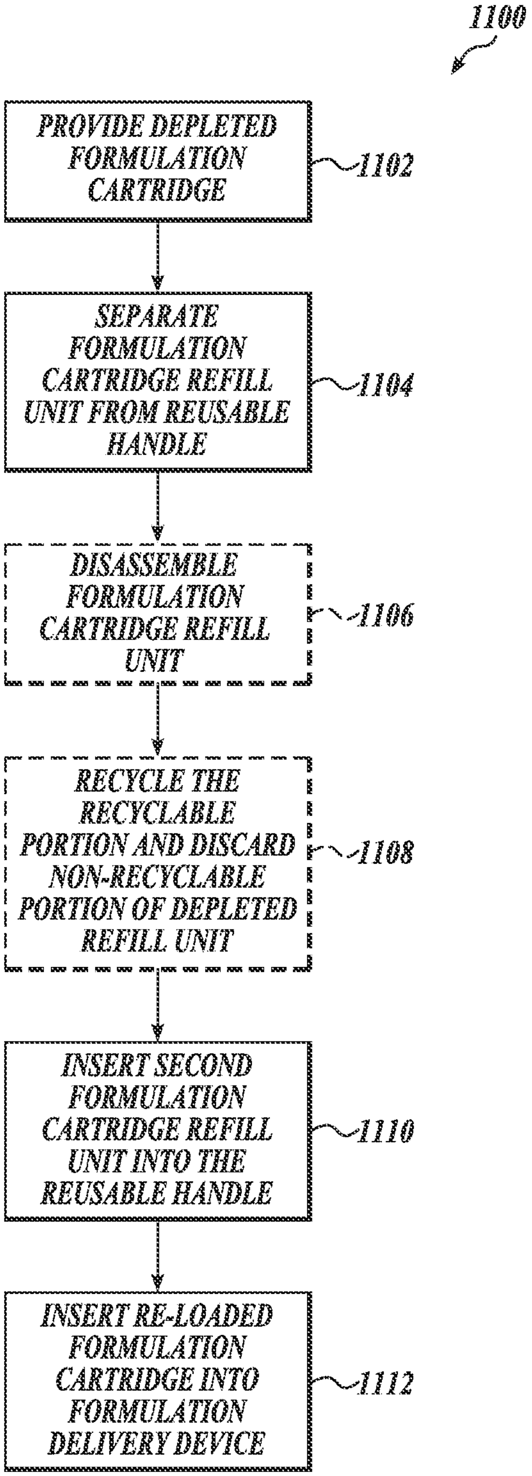
FIG. 11 shows a method of reloading a formulation cartridge, in accordance with a representative embodiment of the present disclosure.

FIG. 11 shows representative methods 1100 which may be used with any of the formulation cartridges of the present disclosure, for example the formulation cartridge 800 of FIG. 8A-FIG. 10. As one example, FIG. 11 provides methods of replenishing or reloading formulation cartridges of the present disclosure.

At step 1102, a formulation cartridge is provided, e.g., a formulation cartridge configured to provide at least one formulation to a formulation delivery device. In some embodiments, the formulation cartridge includes a formulation pouch which is depleted of formulation. In some embodiments, the formulation cartridge is removed from a formulation delivery device, e.g., by depressing a cartridge release and pulling the formulation cartridge out of the formulation delivery device. In any embodiment, the formulation cartridge comprises a reusable body or handle and a formulation cartridge refill unit, which may include a valve frame engaging a refill packet storing the at least one formulation. In any embodiment, the refill packet includes a shell enclosing at least one vessel storing the at least one formulation.

At step 1104, the formulation cartridge refill unit is separated from the reusable handle. In some embodiments, the reusable handle is disassembled into two or more parts, thereby revealing at least a portion of the formulation cartridge refill unit, and then removing the formulation cartridge refill unit from the disassembled reusable handle.

In optional step 1106, the formulation cartridge refill unit is at least partially disassembled, for example by separating the refill packet from the valve frame (such as by separating at least one formulation vessel from a shell). In some embodiments, a recyclable portion of the refill unit is separated from a non-recyclable portion of the refill unit. For example, the valve frame and formulation pouches are separated from the body portion and/or the optional packet sleeve (both of which are recyclable in some embodiments), e.g., by tearing an integral tearaway on the packet sleeve or body portion and pulling the valve frame (along with the depleted formulation pouches secured thereto) away from the packet sleeve and body portion.

In optional step 1108, the recyclable portion(s) of the refill unit is recycled (i.e., the body portion, the valve frame, and/or the packet sleeve), and the non-recyclable portion(s) is discarded (i.e., the depleted formulation pouches and valve frame).

In step 1110, a new refill unit is inserted into the reusable cartridge handle.

In step 1112, the reloaded formulation cartridge is inserted again into the formulation delivery device after inserting the new refill unit into the reusable cartridge handle.

Thus, the present disclosure provides not only sustainable formulation cartridges, but also methods of using the same to further reduce waste and environmental impact.

Figure 12:
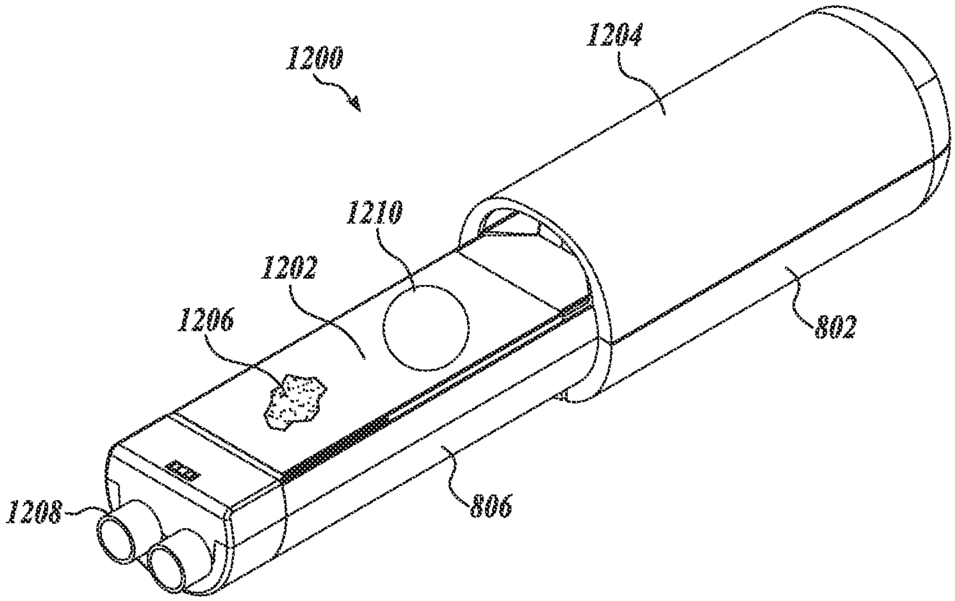
FIG. 12 shows a perspective view of a cleaning cartridge, in accordance with a representative embodiment of the present disclosure.

FIG. 12 shows a representative cleaning cartridge 1200, which has the same features as cleaning cartridges described previously, and which is compatible with any formulation delivery system, formulation delivery device, and product line of the present disclosure. Accordingly, cleaning cartridge 1200 is of a same cartridge type (e.g., is configured to securely fit inside the reusable handle of the formulation delivery device, has the same shape and dimensions and a plurality of output nozzles) as formulation cartridges described herein.

The primary function of cleaning cartridge 1200 is to fluidically connect with a formulation delivery device, and to provide a cleaning liquid 1202 (e.g., water) that is flushed through a formulation dispensing assembly as part of a cleaning routine. Accordingly, cleaning cartridge 1200 is a reusable assembly with a body portion 1204 formed of an ABS plastic or other suitably rigid polymer. Body portion 1204 supports a cleaning liquid reservoir 1206, i.e., a tank, which stores the cleaning liquid 1202 therein, e.g., 50-200 mL thereof. The cleaning liquid reservoir 1206 has a plurality of output nozzles 1208 which are sized and positioned to fluidically couple with fluid conduits of the formulation delivery device. A refill cap 1210 facilitates refilling the cleaning liquid reservoir 1206.

Figure 13:
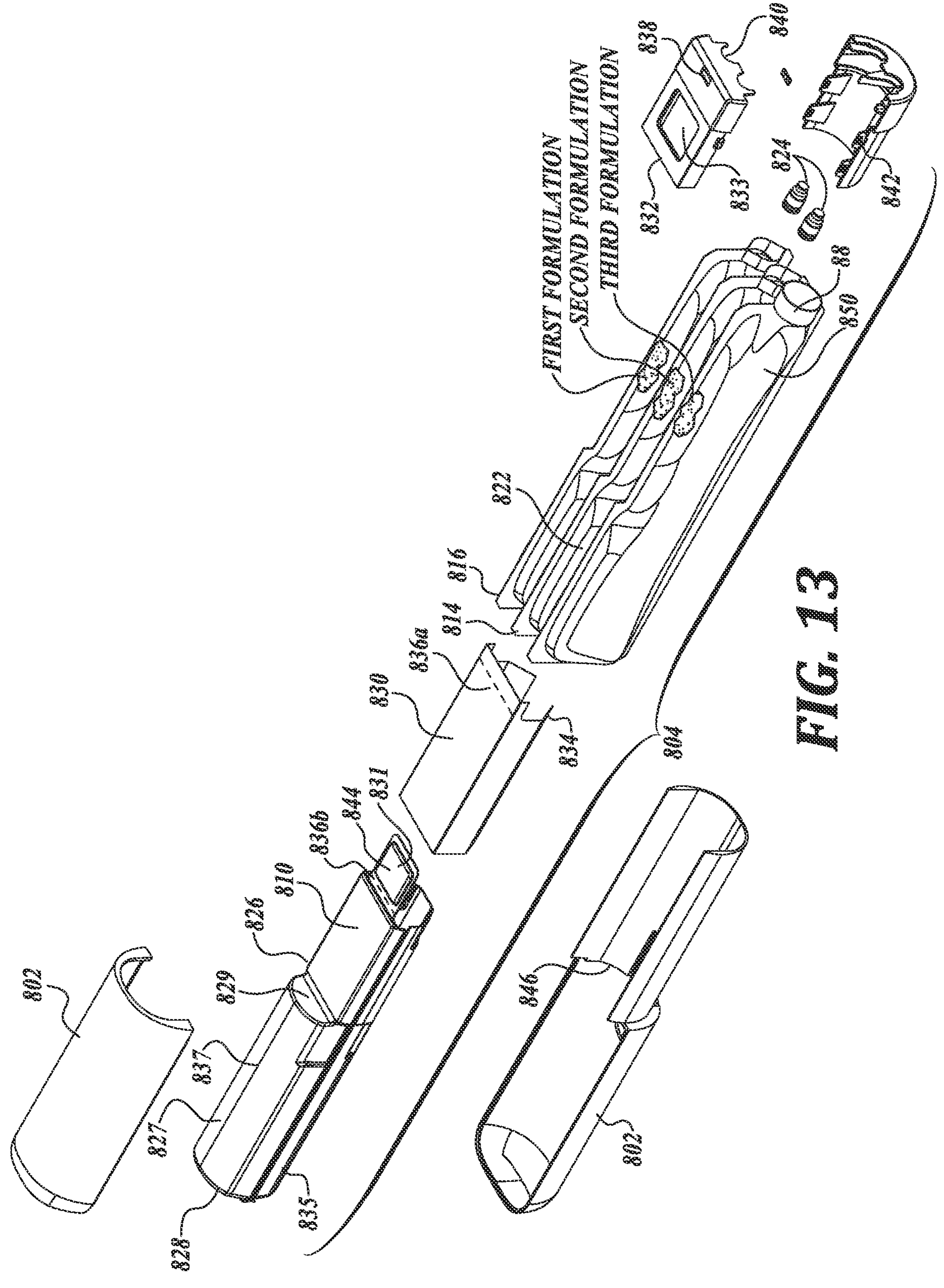
FIG. 13 shows an exploded perspective view of an example formulation cartridge, in accordance with a representative embodiment of the present disclosure.

FIG. 13 shows an exploded perspective view of an example formulation cartridge, in accordance with a representative embodiment of the present disclosure. As best shown in FIG. 13, refill unit 804 generally includes a refill packet comprising a shell 826 enclosing at least one formulation vessel (e.g., a packet, pouch, or other vessel), for example a first formulation pouch 814, a second formulation pouch 816, a cleaning vessel 850 and a valve frame 832 coupled with the refill packet, e.g., a front body portion 810 of the shell 826. The first formulation pouch 814, second formulation pouch 816, and cleaning vessel 850 respectively contain a first formulation 818, a second formulation 820, and a cleaning solution. The refill unit 804 may optionally include packet sleeve 830.

Each of first formulation pouch 814, second formulation pouch 816, and cleaning vessel 850 has a volume of about 40 mL to about 70 mL, about 50 mL to about 60 mL, about 40 mL to about 65 mL, about 40 mL to about 60 mL, about 40 mL to about 55 mL, about 40 mL to about 50 mL, about 45 mL to about 70 mL, about 50 mL to about 70 mL, about 55 mL to about 70 mL, about 60 mL to about 70 mL, or about 55 mL. In some embodiments, first formulation pouch 814, second formulation pouch 816, and cleaning vessel 850 have different volumes. In some embodiments, refill unit 804 stores only a single formulation vessel.

The first formulation 818 and second formulation 820 can each be any of the formulations described herein, for example a permanent hair dye; semi-permanent hair dye; developer; conditioner; hair growth treatment, such as minoxidil; hair protein treatment; disulfide bond repairing hair treatment; fluid hair treatment; fluid scalp treatment, or the like. In some embodiments, the first formulation 818 and second formulation 820 differ. For example, in some embodiments, the first formulation 818 is a hair dye and the second formulation 820 is a developer. In other embodiments, the first formulation 818 and second formulation 820 are the same (e.g., a conditioner or scalp treatment formulation).

As shown in FIG. 9A, each formulation pouch 814, 816 and the cleaning vessel 850 includes a formulation-containing packet 822 and valve means for selectively-fluidic coupling the refill unit to a dispensing nozzle unit of a formulation delivery device when the formulation cartridge 800 is received within the hand-held formulation dispensing device. Representative valve means include a valve 824 through which the formulation exits the packet 822. Representative formulation vessels are described in International Patent Application Publication No. 2019/067336A2, published Apr. 4, 2019 and assigned to L'Oreal SA, and U.S. Patent Application Publication No. 2021/0196021A1, published Jul. 1, 2021 and assigned to L'Oreal SA, both of which are hereby incorporated by reference in their entireties for all purposes.

The shell 826 has an elongate shape sized to be received within the reusable handle portion 802. Shell 826 encloses and protects the first formulation pouch 814 and second formulation pouch 816 and engages the valve frame 832 (described below). Thus, shell 826 functions as packaging which protects the formulation pouches 814, 816 during commerce prior to loading into the formulation delivery device.

In some embodiments, shell 826 has a total length between 150 mm and 250 mm (e.g., 175 mm-225 mm, 185 mm-215 mm, 195 mm-205 mm, or 200 mm) and a maximum cross sectional dimension of 25 mm-50 mm (e.g., 30 mm-45 mm, 35 mm-40 mm, or 36 mm). Shell 826 has a rear body portion 828 and a slender front body portion 810, e.g., a neck portion, extending away from the body portion 828. The body portion 828 and the slender front body portion 810 generally align in a common longitudinal direction to enable assembly with the reusable handle portion 802, and to enable insertion into the cartridge cavity of the formulation delivery device.

In some embodiments, shell 826 is constructed at least partially from a recyclable or recycled material, e.g., a paper material such as an injection-molded paper material or a die-cut structured paper (e.g., cardboard). In the illustrated embodiment, the shell 826 is formed from a single piece of injection-molded paper material. In some embodiments in which the shell 826 is formed of paper, the paper has a weight between 8-12 points (e.g., 8.5 points, 9.0 points, 9.5 points, 10.0 points, 10.5 points, 11.0 points, or 11.5 points), to impart sufficient stiffness without contributing excess disposable material.

The rear body portion 828 of the shell 826 has a larger cross-sectional dimension than the front body portion 810 when viewed in a plane normal to the longitudinal direction of the cartridge 800. A hump or bulge 827 imparts the larger cross sectional area of the rear body portion 828 relative to the slender front body portion 810. Advantageously, the hump or bulge 827 enables the use of higher-volume formulation pouches 814, 816. Additionally, the hump or bulge 827 forms an abutment 829 which abuts a corresponding interior face of the handle portion 802 and secures the longitudinal position of the shell 826 during use.

The slender front body portion 810 of the shell 826 is sized to fit within the tray portion 806 of the handle portion 802 and to project into the cartridge cavity of the formulation delivery device during use. As shown best in FIG. 8A, the front body portion 810 couples with the valve frame 832. To facilitate secure connection and alignment with the valve frame 832, front body portion 810 includes valve frame coupling means, for example at least one coupling tab 844 configured to selectively engage the valve frame 832. In the illustrated embodiment, the front body portion 810 includes a single coupling tab 844 extending away from a front end thereof. The coupling tab 844 includes an engagement feature, for example a detent or raised prominence 831 shaped and sized to engage a complementary aperture 833 of the valve frame 832.

Figure 14:
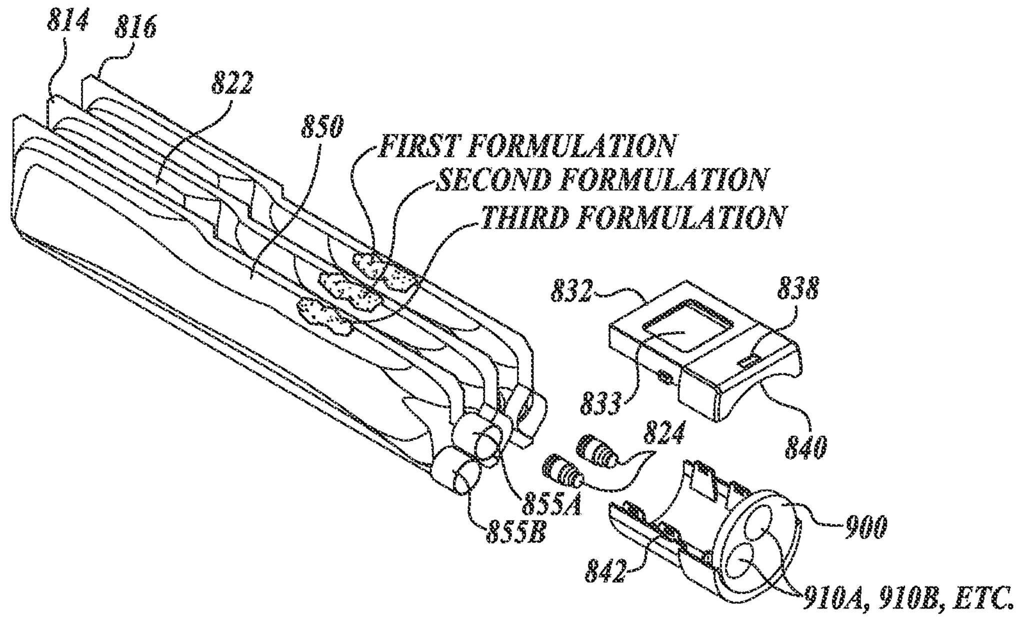
FIG. 14 shows an exploded perspective view of the example formulation cartridge of FIG. 13, in accordance with a representative embodiment of the present disclosure.

FIG. 14 shows an exploded perspective view of the example formulation cartridge of FIG. 13, in accordance with a representative embodiment of the present disclosure. In some embodiments, the cleaning vessel 850 includes a valve 855. In some embodiments, the valve frame 832 encloses a valve selector 900. In some embodiments, the valve selector 900 includes a plurality of holes 910A, 910B, etc. While two holes 910A and 910B are illustrated, it should be understood that any number of holes 910 may be in the valve selector 900. In some embodiments, the valve selector 900 includes as many holes 910 as there are formulation pouches 814, 816 and cleaning vessels 850. For example, in the case where the formulation cartridge includes a first formulation pouch 814, a second formulation pouch 816, and a cleaning vessel 850, the valve selector may have three holes 910. In some embodiments, such as the one illustrated in FIG. 14, the valve selector 900 may have one hole 910 less than the number of pouches/vessels in the formulation cartridge. In yet another embodiments, the valve selector may include only a single hole 910. In some embodiments, the one or more valves 824 may be electronic valves. In some embodiments, the valve selector 900 may be a processor communicatively coupled to the one or more valves 824 to selectively close and open the valves 824. In some embodiments, the processor may be located on the dispensing device, such as the dispensing device of FIG. 1. It should be understood that the valve selector 900 is capable of being incorporated into any of the embodiments described herein.

In operation, the valve selector rotates to selectively allow formula or cleaning solution to pass through one or more of the holes 910A, 910B, etc., as described in FIGS. 16A-16D.

Figure 15:
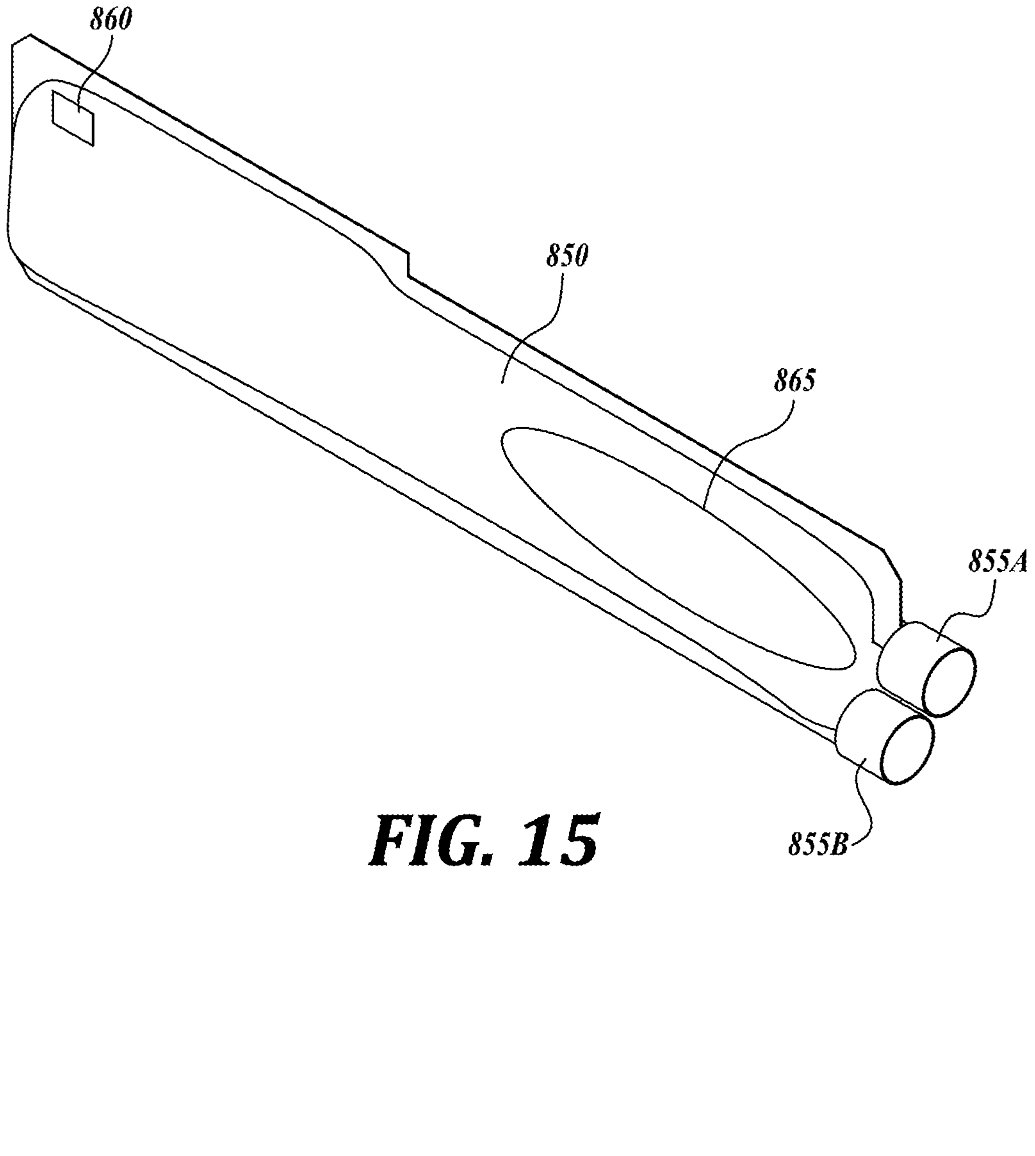
FIG. 15 shows a cleaning vessel, in accordance with a representative embodiment of the present disclosure.

FIG. 15 shows a cleaning vessel 850, in accordance with a representative embodiment of the present disclosure. In some embodiments, the cleaning vessel 850 includes an identifier 860, a first valve 855A, a second valve 855B, and a frangible ampoule 865, configured to hold a cleaning solution. In some embodiments, the identifier 860 is an encryption chip disposed on the refill unit and stores at least a cleaning fluid identifier. In some embodiments, such as illustrated in FIG. 15, the identifier 860 is located on the cleaning vessel 850. In some embodiments, the identifier is an RFID chip.

In some embodiments, the cleaning vessel 850 holds and stores a cleaning solution in a frangible ampoule 865. In operation, the frangible ampoule 865 may be pierced or crushed to release the cleaning solution. In some embodiments, a user can manually release the cleaning solution from the frangible ampoule 865. In some embodiments, a processor located on the formulation cartridge or the dispensing device may direct the frangible ampoule 865 to release the cleaning solution.

In some embodiments, the cleaning vessel 850 includes two valves 855A, 855B. In some embodiments, the cleaning vessel 850 includes as many valves 855 as holes 910 in the valve selector 900 of FIG. 14. In some embodiments, the two valves 855A, 855B are configured to correspond to the two holes 910A, 910B in the valve selector 900, so that when the formulation cartridge is in "cleaning mode" the cleaning solution is dispensed from the two valves 855A, 855B through the two holes 910A, 910B of the valve selector 900, as explained in FIGS. 16A-16D.

FIGS. 16A-16D shows a valve selector 900 in operation, in accordance with a representative embodiment of the present disclosure. In some embodiments, the valve selector 900 includes a rotating barrel comprising an aperture (or hole) 910 through a distal surface thereof, where the valve selector 900 is configured to selectively obstruct the first valve or the second valve 824. In some embodiments, the valve selector 900 is configured to selectively obstruct both valves 824. In some embodiments, the valve selector 900 is configured to selectively obstruct the first and second valve 855A, 855B but not the valves 824.

Figure 16A:
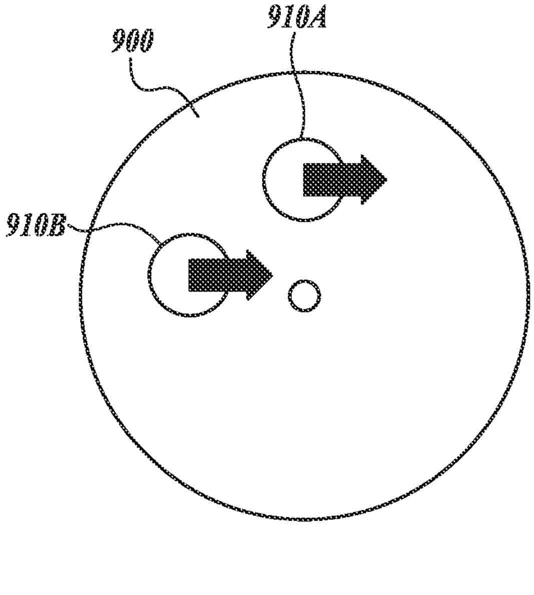
FIGS. 16A-16D shows a valve selector in operation, in accordance with a representative embodiment of the present disclosure.

In operation, the valve selector 900 can switch to a plurality of modes, as shown in FIGS. 16A-16D. In dispensing mode, as shown in FIG. 16A, both apertures (holes) 910A, 910B are unblocked (white) and coupled to one or more of the valves 824 of the formulation pouches 814, 816. In this mode, formula may be dispensed through the holes 910A, 910B.

Figure 16B:
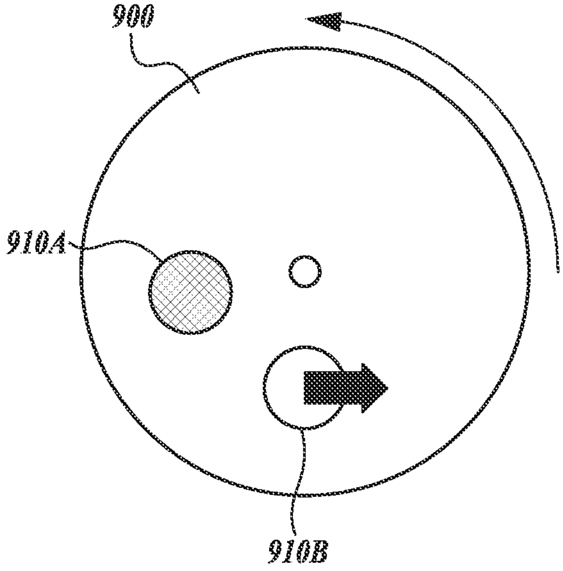

In FIG. 16B, the valve selector is rotated into a first cleaning mode, as shown by the arrow. In first cleaning mode, the aperture 910B is unblocked, and coupled to a valve 855 of the cleaning vessel 850 (such as shown in FIG. 14), which aperture 910A is blocked. In this manner, cleaning solution can be dispensed through just aperture 910B.

Figure 16C:
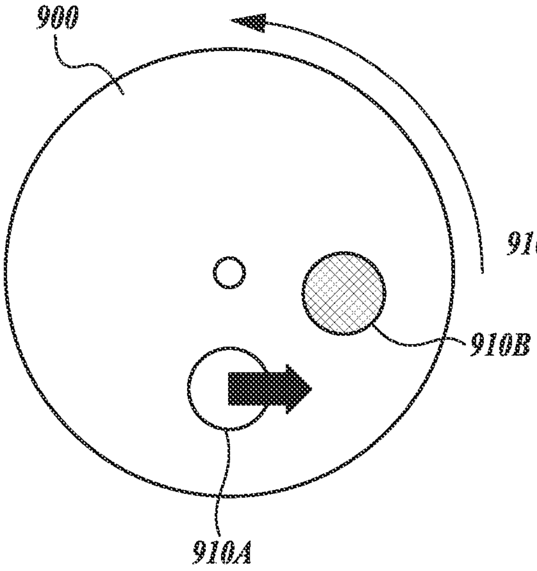

In FIG. 16C, the valve selector 900 is rotated into a second cleaning mode, as shown by the arrow. In some embodiments, second cleaning mode is preceded by first cleaning mode. In second cleaning mode, aperture 910A is unblocked, allowing a cleaning solution to be dispensed from the valve 855 of a cleaning vessel 850, while aperture 910B is blocked.

Figure 16D:
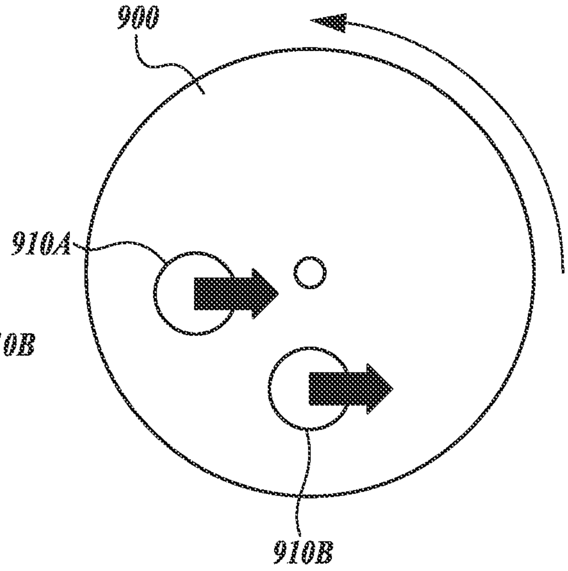

In some embodiments, the formulation cartridge may include either two cleaning vessels 850 or a single cleaning vessel 850 with two valves 855A, 855B (as shown in FIG. 15). In such an embodiments, the valve selector 900 may include only a single cleaning mode, such as shown in FIG. 16D. In this cleaning mode, the valve selector 900 is rotated so that apertures 910A, 910B are aligned with either the two cleaning vessels 850 or the two valves 855A, 855B on the cleaning vessel 850, so that cleaning solution may be dispensed through both apertures 910A, 910B simultaneously.

Figure 17:
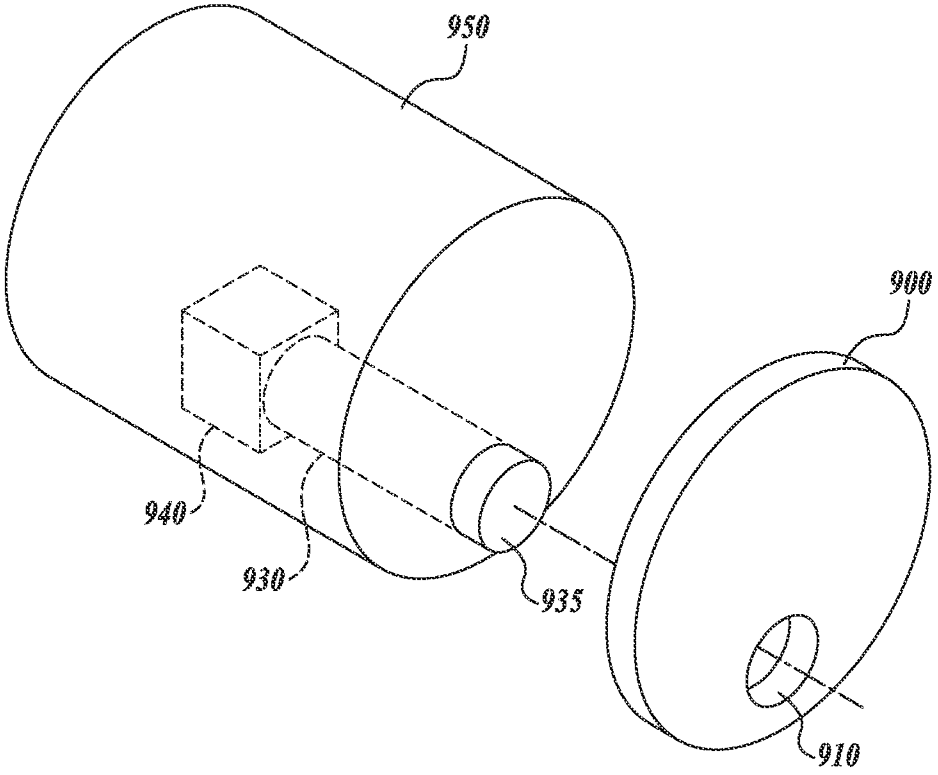
FIG. 17 shows an example formulation cartridge adaptor, in accordance with a representative embodiment of the present disclosure.

FIG. 17 shows an example formulation cartridge adaptor, in accordance with a representative embodiment of the present disclosure. In some embodiments, the formulation cartridge may include an adaptor 950 coupled to the formulation cartridge and/or the valve selector 900. In some embodiments, the adaptor 950 includes a tube 930, a connector 935, and a return fluid conduit 940. In some embodiments, the tube 930 is fluidly coupled to the aperture 910 with the connector 935. In some embodiments, the valve selector 900 is rotated so that the aperture 910 and the tube 930 are fluidly coupled via the connector 935.

In operation, the cleaning solution may be dispensed through the aperture 910 and into the tube 930. The cleaning fluid may then be directed back to the cartridge with the return fluid conduit 940. In some embodiments, the return fluid conduit 940 is a peristatic pump. In some embodiments, the return fluid conduit 940 forces the cleaning solution back into the cleaning vessel 850, or to a dedicated waste water reservoir within the formulation cartridge or the dispensing device. In some embodiments, the adaptor 950 is attached to the valve selector 900 after the user has dispensed a first formulation, a second formulation, or both.

Figure 18:
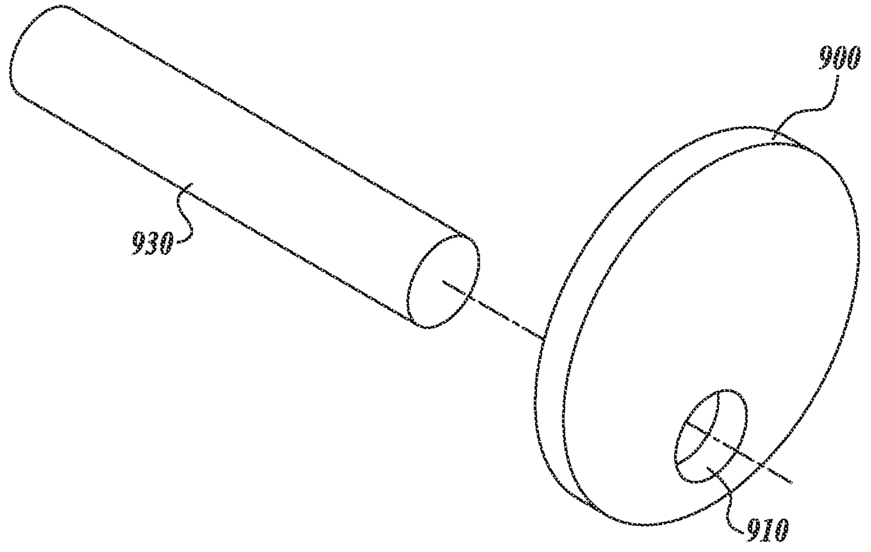
FIG. 18 shows an example formulation cartridge adaptor, in accordance with a representative embodiment of the present disclosure.

FIG. 18 shows an example formulation cartridge adaptor, in accordance with a representative embodiment of the present disclosure. In some embodiments, the adaptor is just tube 930. In some embodiments, the tube 930 is fluidly coupled to the cleaning vessel through the valve selector 900. In some embodiments, the tube 930 can be coupled with a fluid source (not pictured). In some embodiments, the fluid source is a sink.

In operation, the tube 930 is coupled to a fluid source so that water or cleaning fluid flows from the fluid source and into the cleaning vessel or the formulation cartridge, cleaning the formulation cartridge.

Figure 19:
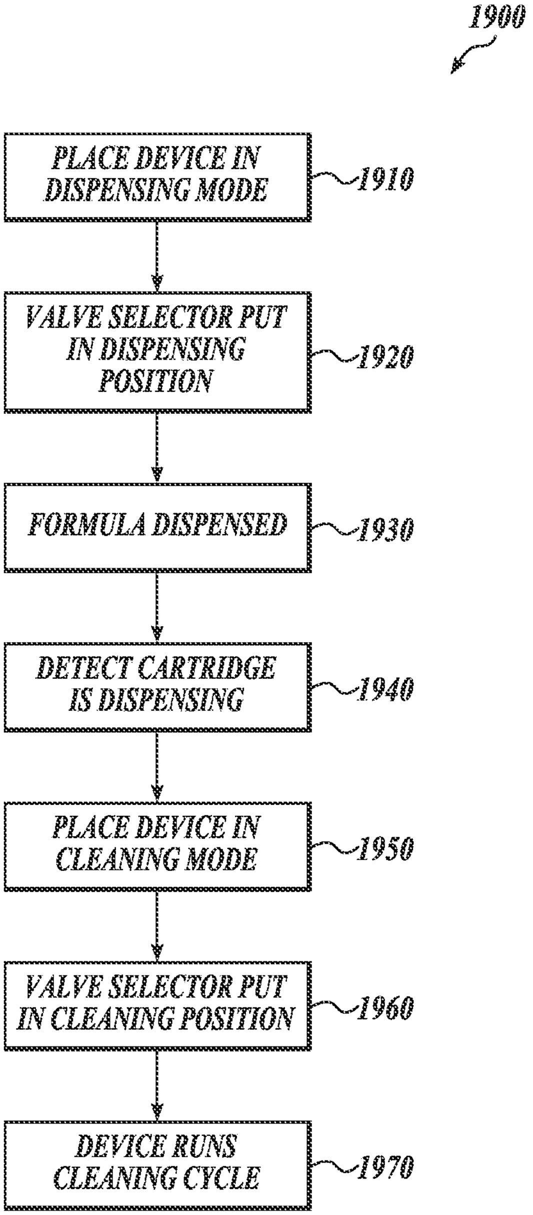
FIG. 19 is an example method of cleaning a dispensing device, in accordance with a representative embodiment of the present disclosure.

FIG. 19 is an example method 1900 of cleaning a dispensing device, in accordance with a representative embodiment of the present disclosure. The method 1900 begins in block 1910. In block 1910, the dispensing device is placed into dispensing mode. In some embodiments, the device is placed into dispensing mode by a user, either by actuating an actuator or providing a command to the dispensing device. In some embodiments, the device is places into dispensing mode based on its proximity to a surface, or based on an orientation of the dispensing device.

In block 1920, the valve selector, such as valve selector 900 is put into the dispensing position. In some embodiments, the valve selector is adjusted to be put in the dispensing position. In some embodiments, the valve selector is rotated into the dispensing position (or mode as in FIG. 16A), so that one or more formulations may be dispensed by the dispensing device.

In block 1930, the formulation is dispensed from the formulation cartridge. In some embodiments, both the first formulation and the second formulation are dispensed from the formulation cartridge. In some embodiments, the first formulation and the second formulation are dispensed simultaneously. In some embodiments, the first formulation and the second formulation are dispensed subsequently.

Optionally, in block 1940, it is detected as to whether the cartridge is dispensing. In some embodiments, the device detects whether or not the cartridge is dispensing. In some embodiments, the cartridge detects whether the device is dispensing. In some embodiments, the user can detect whether the device is dispensing through observation.

In block 1950, the delivery device is placed into the cleaning mode. In some embodiments, the delivery device is placed into cleaning mode by a user, such as by actuating an actuator or otherwise directing the delivery device. In some embodiments, the device is placed into cleaning mode based on the detection that the cartridge is dispensing. When the cartridge has stopped dispensing, the delivery device may immediately go into cleaning mode. In some embodiments, the delivery device may alert the user that it will go into cleaning mode, or else suggest that the user manually place the device into cleaning mode. In some embodiments, the device provides instructions to the user for cleaning mode, including attaching an adaptor (such as adaptor 950 in FIGS. 17-18) or to hook the device up to a fluid source, such as a sink.

In block 1960, the valve selector is adjusted into the cleaning position. In some embodiments, the cleaning position is that of FIG. 16B, 16C, or 16D. In some embodiments, the valve selector communicatively controls the valves of the formulation vessels and/or the cleaning vessels to selectively close, so as to block formula from the formulation vessels and to allow the cleaning fluid to be dispensed. In some embodiments, the valve selector is adjusted by the processor on the delivery device. In some embodiments, valve selector is adjusted manually by a user of the delivery device.

In block 1970, the device runs a cleaning cycle. In some embodiments, running the cleaning cycle includes dispensing the cleaning fluid through the device. In some embodiments, wherein method further includes pumping the cleaning fluid out of the valve selector for a duration and withdrawing the cleaning fluid into a location in the delivery device. In some embodiments, the location is the cleaning vessel. In some embodiments, the method further includes pumping the cleaning fluid out of the valve selector for a duration and pulling water from a fluid source into the cleaning vessel.

The present application may also reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, circuitry includes one or more ASICs having a plurality of predefined logic components. In an embodiment, circuitry includes one or more FPGA having a plurality of programmable logic components. In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like. In an embodiment, circuitry includes a baseband integrated circuit or applications processor integrated circuit or a similar integrated circuit in a server, a cellular network device, other network device, or other computing device. In an embodiment, circuitry includes one or more remotely located components. In an embodiment, remotely located components are operatively connected via wireless communication. In an embodiment, remotely located components are operatively connected via one or more receivers, transmitters, transceivers, or the like.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, circuitry includes one or more user input/output components that are operatively connected to at least one computing device to control (electrical, electromechanical, software-implemented, firmware-implemented, or other control, or combinations thereof) one or more aspects of the embodiment.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A formulation cartridge, comprising:
- a handle portion; and
- a refill unit configured to sit within the handle portion, the refill unit comprising:
  - a formulation vessel storing a formulation and comprising a first valve in fluid communication with the formulation;
  - a cleaning vessel storing a cleaning fluid and comprising a second valve in fluid communication with the cleaning fluid;
  - an encryption chip disposed on the refill unit and storing at least a cleaning fluid identifier; and
  - a valve selector configured to selectively permit the formulation to pass from the first valve or the cleaning fluid to pass from the second valve.

2. The formulation cartridge of claim 1, wherein the valve selector comprises a rotating barrel comprising an aperture through a distal surface thereof, wherein the valve selector is configured to selectively obstruct the first valve or the second valve.

3. The formulation cartridge of claim 1, wherein the valve selector comprises a processor communicatively coupled to the first valve.

4. The formulation cartridge of claim 1, wherein the refill unit further comprises a second formulation vessel storing a second formulation and comprising a third valve in fluid combination with the second formula.

5. The formulation cartridge of claim 1, wherein the refill unit comprises a shell enclosing the formulation vessel and the cleaning vessel.

6. The formulation cartridge of claim 5, wherein the shell is secured to a valve frame which receives the first valve and the second valve.

7. A system for dispensing a formulation, the system comprising:

a formulation cartridge, comprising:

a handle portion; and a refill unit configured to sit within the handle portion, the refill unit comprising:

a formulation vessel storing a formulation and comprising a first valve in fluid communication with the formulation;

a cleaning vessel storing a cleaning fluid and comprising a second valve in fluid communication with the cleaning fluid;

an encryption chip disposed on the refill unit and storing at least a cleaning fluid identifier; and a valve selector configured to selectively permit the formulation to pass from the first valve or the cleaning fluid to pass from the second valve; and a delivery device configured to communicatively coupled to the formulation cartridge, wherein the delivery device comprises a processor configured to:

place the delivery device into a dispensing mode;

adjust the valve selector into a dispensing position;

dispense a formulation from the formulation cartridge;

place the delivery device into a cleaning mode;

adjust the valve selector into a cleaning position; and run a cleaning cycle.

8. The system of claim 7, wherein the delivery device further comprises an adaptor configured to close the first valve and the second valve.

9. The system of claim 8, wherein the adaptor is further configured to direct the cleaning fluid back to the cartridge after the cleaning fluid has passed through the second valve.

10. The system of claim 9, wherein the handle further comprises a return fluid conduit configured to return the cleaning fluid into a location in the formulation cartridge.

11. The system of claim 10, wherein the location is the cleaning vessel.

12. The system of claim 10, wherein the location is a waste reservoir.

13. A method of cleaning the system of claim 7, comprising:

placing the delivery device into the dispensing mode;

adjusting the valve selector into the dispensing position;

dispensing the formulation from the formulation cartridge;

placing the delivery device into the cleaning mode;

adjusting the valve selector into the cleaning position; and running the cleaning cycle.

14. The method of claim 13, wherein the valve selector is adjusted by the processor on the delivery device.

15. The method of claim 13, wherein the valve selector is adjusted manually by a user of the delivery device.

16. The method of claim 13, wherein running the cleaning cycle comprises: dispensing the cleaning fluid through the device.

17. The method of claim 16, wherein the method further comprises:

pumping the cleaning fluid out of the valve selector for a duration, and withdrawing the cleaning fluid into a location in the delivery device.

18. The method of claim 16, wherein the location is the cleaning vessel.

19. The method of claim 16, wherein the method further comprises:

pumping the cleaning fluid out of the valve selector for a duration, and pulling water from a sink into the cleaning vessel.

* * * * *